US012707155B2

(12) United States Patent
Wang

(10) Patent No.: US 12,707,155 B2
(45) Date of Patent: Aug. 11, 2026

(54) CORRECTION SYSTEM AND CORRECTION METHOD FOR ILL-EXPOSED IMAGES

(71) Applicant: INDUSTRIAL TECHNOLOGY RESEARCH INSTITUTE, Hsinchu (TW)

(72) Inventor: Te-Mei Wang, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 308 days.

(21) Appl. No.: 18/384,083

(22) Filed: Oct. 26, 2023

(65) Prior Publication Data

US 2024/0163570 A1 May 16, 2024

Related U.S. Application Data

(60) Provisional application No. 63/419,366, filed on Oct. 26, 2022.

(51) Int. Cl.

| | |
|---|---|
| ***H04N 23/76*** | (2023.01) |
| ***G06V 10/56*** | (2022.01) |
| ***G06V 10/60*** | (2022.01) |
| ***G06V 10/75*** | (2022.01) |
| ***G06V 10/764*** | (2022.01) |

(52) U.S. Cl.

CPC ............. *H04N 23/76* (2023.01); *G06V 10/56* (2022.01); *G06V 10/60* (2022.01); *G06V 10/758* (2022.01); *G06V 10/764* (2022.01)

(58) Field of Classification Search

CPC ........ H04N 23/76; G06V 10/56; G06V 10/60; G06V 10/758; G06V 10/764

See application file for complete search history.

(56) References Cited

U.S. PATENT DOCUMENTS

| | | | |
|---|---|---|---|
| 7,466,868 | B2 | 12/2008 | Wilensky |
| 8,149,283 | B2 | 4/2012 | Doida |

(Continued)

FOREIGN PATENT DOCUMENTS

| | | | |
|---|---|---|---|
| CN | 101288099 | B | 11/2012 |
| CN | 105744156 | A | 7/2016 |

(Continued)

OTHER PUBLICATIONS

Taiwanese Office Action and Search Report for Taiwanese Application No. 112141101, dated Jun. 27, 2024.

(Continued)

*Primary Examiner* — Wassim Mahrouka

(74) *Attorney, Agent, or Firm* — Birch, Stewart, Kolasch & Birch, LLP

(57) ABSTRACT

A correction method for ill-exposed (IE) images, comprises the following steps. (1) A series of original images are captured. (2) The original images are classified as a set of first well-exposed (WE) images and IE images by utilizing a first computational model, according to a lightness distribution of each of the original images. The IE images have a plurality of exposure types including a back-lit (BL) type, an over-exposed (OE) type, and an under-exposed (UE) type. (3) The IE images are corrected to obtain a set of second WE images by utilizing a second computational model. A plurality of perceptual parameters and structural parameters of each of the IE images are extracted and then adjusted according to the BL, OE, and UE types respectively. (4) The first WE images and the second WE images are provided as a set of output images.

18 Claims, 16 Drawing Sheets

(56) References Cited

U.S. PATENT DOCUMENTS

| | | | | |
|---|---|---|---|---|
| 8,718,359 | B2 | 5/2014 | Sakai et al. | |
| 8,917,332 | B2 | 12/2014 | Ono | |
| 11,651,495 | B2 | 5/2023 | Chou et al. | |
| 2005/0074180 | A1* | 4/2005 | Wilensky | G06V 10/30<br>382/254 |
| 2010/0259639 | A1* | 10/2010 | Hung | H04N 23/88<br>382/167 |
| 2011/0026818 | A1 | 2/2011 | Yen et al. | |
| 2021/0289115 | A1* | 9/2021 | Afifi | H04N 25/00 |
| 2022/0269910 | A1 | 8/2022 | Onzon et al. | |

FOREIGN PATENT DOCUMENTS

| | | |
|---|---|---|
| TW | I394442 B | 4/2013 |
| TW | 201904281 A | 1/2019 |

OTHER PUBLICATIONS

Akai et al., "A Single Backlit Image Enhancement Method for Improvement of Visibility of Dark Part," ICIP 2021, IEEE, 2021, pp. 1659-1663.

Li et al., "Learning-Based Restoration of Backlit Imagine," IEEE Transactions on Image Processing, vol. 27, No. 2, Feb. 2018, pp. 976-986.

Lv et al., "BacklitNet: A dataset and network for backlit image enhancement," Computer Vision and Image Understanding, vol. 218, 2022 (Available Mar. 15, 2022), 103403, pp. 1-9.

Vazquez-Corral et al., "Perceptually-based restoration of backlit images," 26th Color and Imaging Conference Final Program and Proceedings, 2018, pp. 32-37.

Zhang et al., "Zero-Shot Restoration of Back-lit Images Using Deep Internal Learning," Session 3D: Algorithms in Multimedia, Oct. 2019, pp. 1623-1631.

* cited by examiner

Figure 3B:
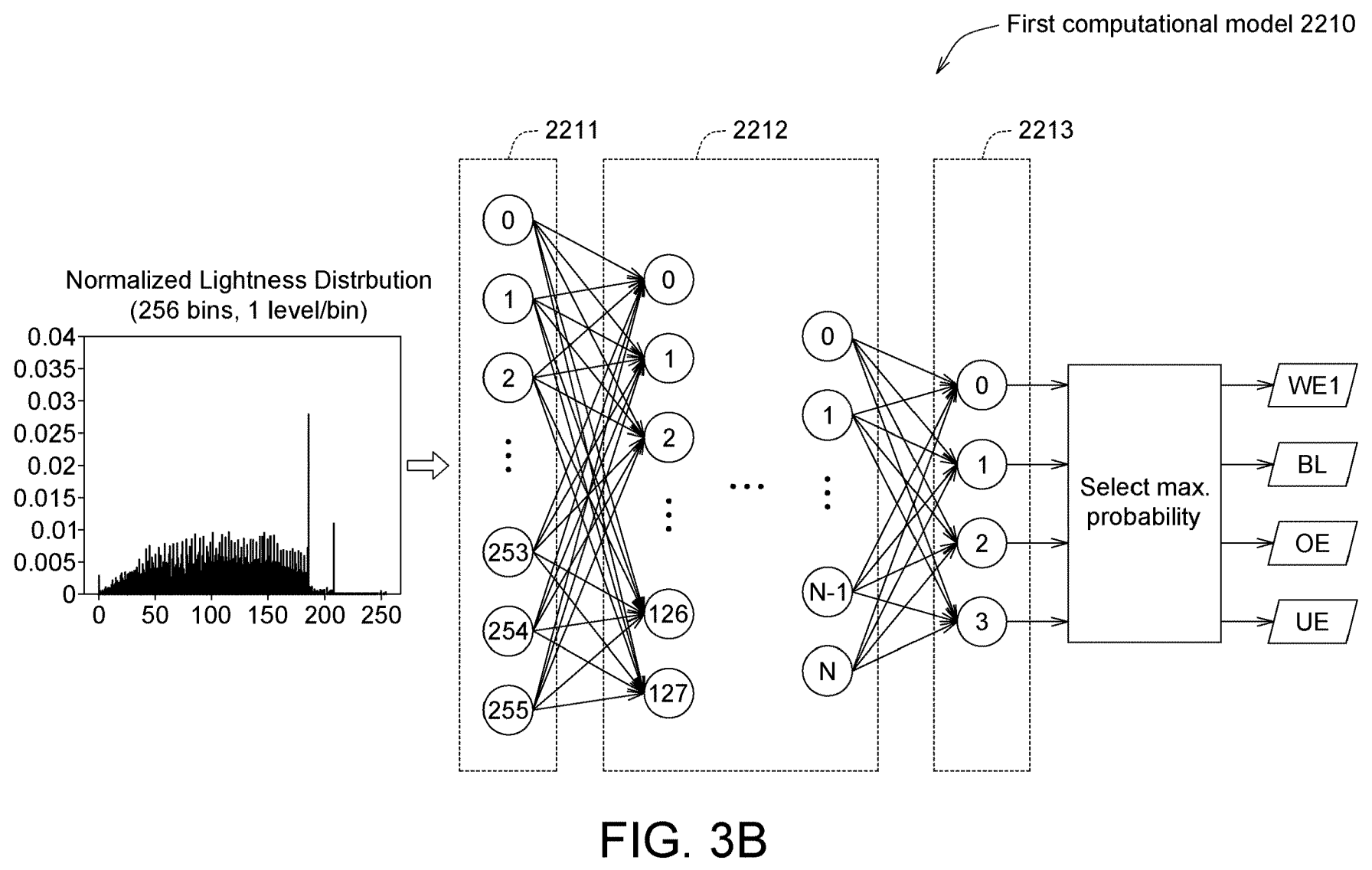

First computational model 2210

2211

2212

2213

Normalized Lightness Distrbution
(256 bins, 1 level/bin)

0.04
0.035
0.03
0.025
0.02
0.015
0.01
0.005
0

0
50
100
150
200
250

0
1
2
...
253
254
255

0
1
2
...
126
127

...

0
1
...
N-1
N 0
1
2
3

Select max.
probability

CORRECTION SYSTEM AND CORRECTION METHOD FOR ILL-EXPOSED IMAGES

This application claims the benefit of U.S. provisional application Ser. No. 63/419,366 filed on Oct. 26, 2022, the entirety of which is incorporated herein by reference.

TECHNICAL FIELD

The present disclosure relates to an image processing system and an operating method thereof, and particularly relates to a correction system and a correction method for ill-exposed (IE) images.

BACKGROUND

As the progress of artificial intelligence (AI) technologies, image processing is widely employed in various applications of our daily life. Such as, image processing may be utilized in applications of face detection and object detection. When performing these applications, images have to be provided with a suitable exposure type to facilitate the subsequent processing.

Various exposure types of images are usually known as a well-exposed (WE) type and an IE type, and the IE type may further include a back-lit (BL) type, an over-exposed (OE) type, and an under-exposed (UE) type. Images are greatly desired to have the WE type in order to better suit subsequent processing; therefore, a correction mechanism is necessary to correct images of the IE type so as to obtain WE images.

However, most existing correction mechanism is dedicated to correct a specific type of IE images, but not suitable for correcting other types of IE images. Such as, a mechanism for correcting the UE type of IE images may not be well applied to correct the OE type of IE images, and vice versa. Moreover, the correction mechanism is required to flexibly suit different operating conditions, e.g., a human perception condition or a computer vision (CV) condition.

In view of the above issues, it is desirable to have an improved correction mechanism for correcting IE images, which may well meet requirements for various exposure types and different operating conditions.

SUMMARY

According to an aspect of the present disclosure, a correction method for IE images is provided. The correction method comprises the following steps. (1) A series of original images are captured. (2) The original images are classified as a set of first WE images and IE images by utilizing a first computational model according to a lightness distribution of each of the original images. The IE images have a plurality of exposure types including a BL type, an OE type, and an UE type. (3) The IE images are corrected to obtain a set of second WE images by utilizing a second computational model. A plurality of perceptual parameters and structural parameters of each of the IE images are extracted and then adjusted according to the BL, OE, and UE types respectively. (4) The first WE images and the second WE images are provided as a set of output images.

According to another aspect of the present disclosure, a correction system for IE images is provided. The correction system comprises the following elements: an image capturing device, a processing device, and an output device. The image capturing device, the processing device, and the output device perform the following functions respectively. (1) The image capturing device captures a series of original images. (2) The processing device is coupled with the image capturing device and/or a storage device to receive the original images. Furthermore, the processing device comprises a first processing unit and a second processing unit which are used to operate a first computational model and a second computational model respectively. More particularly, the first processing unit operates the first computational model to classify the original images as a set of first WE images and IE images according to a lightness distribution of each of the original images. The IE images have a plurality of exposure types including a BL type, an OE type, and an UE type. The second processing unit operates the second computational model to correct the IE images to obtain a set of second WE images. A plurality of perceptual parameters and structural parameters of each of the IE images are extracted and then adjusted according to the BL, OE, and UE types respectively. (3) The output device is coupled with the processing device to receive the first WE images and the second WE images. Furthermore, the output device provides the first WE images and the second WE images as a set of output images.

BRIEF DESCRIPTION OF THE DRAWINGS

FIG. 2A-1 illustrates a lightness distribution of a WE image that has L levels of lightness.

FIG. 2A-2 illustrates the lightness distribution of the WE image with other range coverages.

FIG. 3B illustrates a DNN structure of the first computational model 2210.

Figure 1:
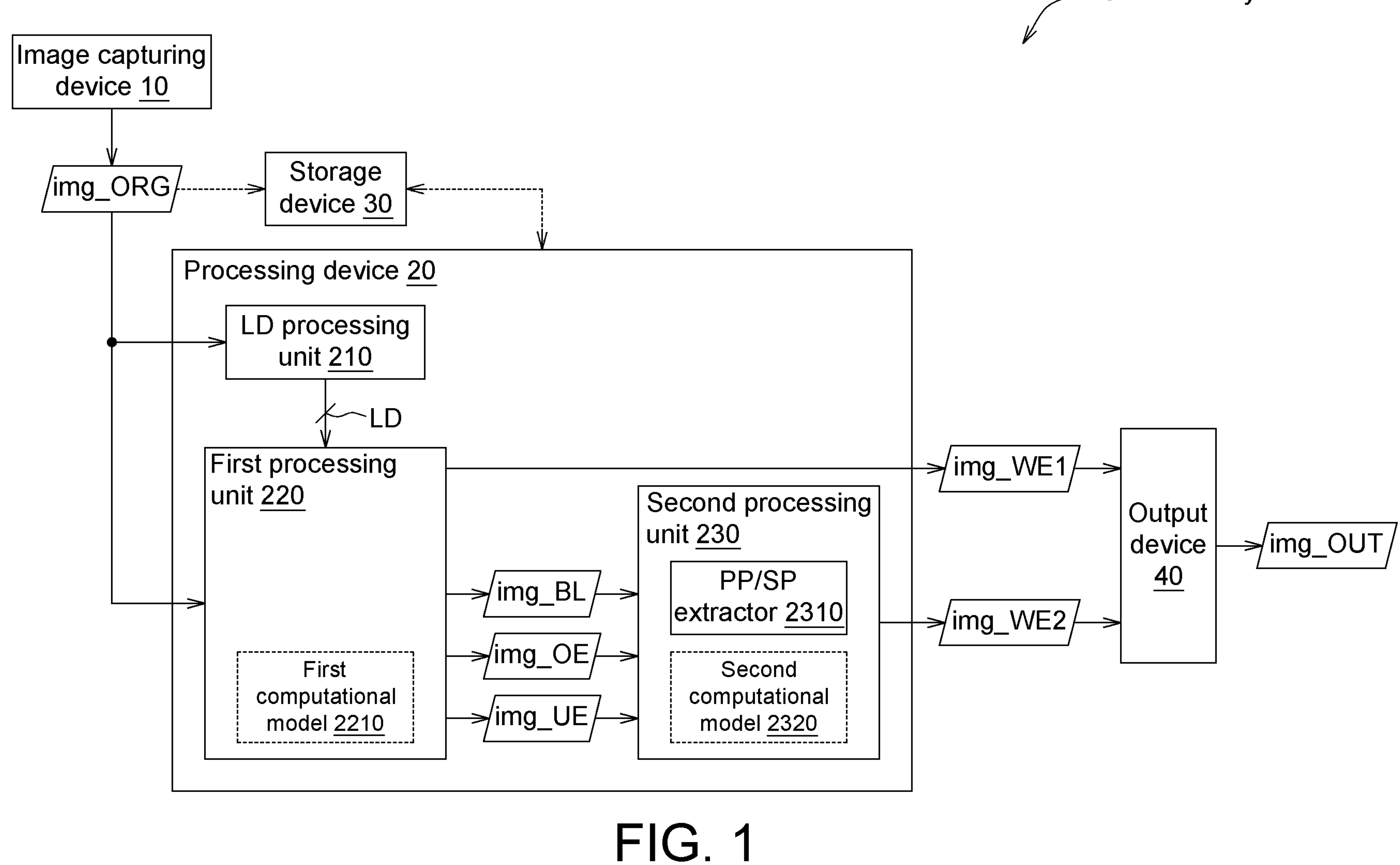
FIG. 1 illustrates a block diagram of a correction system 1000 of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

The correction system 1000 of the present disclosure may be applied to an intelligent visual monitoring system, an advanced driver assistance system (ADAS), a driver monitor system (DMS), and an occupant monitoring system (OMS). The correction system 1000 functions to correct IE images to provide better quality of WE images to facilitate detection for face or limbs, which is used to inspect behavior and health conditions of the driver or occupant inside a vehicle. Furthermore, the correction system 1000 may provide WE images of other objects outside the vehicle, which is used to inspect traffic, road, and environment conditions.

Referring to FIG. 1, which illustrates a block diagram of a correction system 1000 of the present disclosure. The correction system 1000 is used to correct a set of IE images in a series of original images img_ORG so as to obtain a set of output images img_OUT. More particularly, the correction system 1000 is configured to classify the original images img_ORG as the IE images and a set of first WE images img_WE1. The first WE images img_WE1 in the original images img_ORG may not be processed by the correction system 1000. On the other hand, the correction system 1000 may further classify the IE images as three exposure types, including a BL type, an OE type, and an UE type. Then, the correction system 1000 is configured to correct the classified BL images img_BL, OE images img_OE, and UE images img_UE respectively to generate a set of second WE images img_WE2. Thereafter, the correction system 1000 provides the un-processed first WE images img_WE1 and the processed second WE images img_WE2 as the output images img_OUT.

More particularly, the correction system 1000 includes an image capturing device 10, a processing device 20, a storage device 30, and an output device 40. The image capturing device 10 may be any type of camera capable of capturing the original images img_ORG. Such as, the image capturing device 10 is a camera disposed inside a cabin of a vehicle, capable of capturing images of the driver or occupants. Alternatively, the image capturing device 10 is a camera installed on the casing of the vehicle, capable of capturing images of objects around the vehicle.

The storage device 30 is coupled to the image capturing device 10, and the original images img_ORG may be stored in the storage device 30 when necessary. The storage device 30 is a memory device or a disk drive, e.g., a NAND flash memory, a NOR flash memory, a static random access memory (SRAM), a dynamic random access memory (DRAM), a solid state drive (SSD), and a hard disk drive (HDD). Alternatively, the storage device 30 may be a remote database, e.g., a cloud database couple to the image capturing device 10 through a wired or wireless communicating interface.

The processing device 20 is coupled to the image capturing device for receiving the original images img_ORG. Furthermore, the processing device 20 is coupled to the storage device 30 for accessing the original images img_ORG when necessary. The processing device 20 may be an individual hardware element separated from the image capturing device 10 and the storage device 30, such as, the processing device 20 is a single processor, e.g., a central processing unit (CPU), a graphic processing unit (GPU), or a micro control unit (MCU). Alternatively, the processing device 20 may be a processing core within the CPU, the GPU, or the MCU. In another example, the processing device 20 may be an application specific integrated circuit (ASIC) or a field programmable gate array (FPGA). In still another example, the processing device 20 may be a lumped circuit composed of discrete components.

The processing device 20 includes a lightness distribution processing unit 210 (referred to as a "LD processing unit 210"), a first processing unit 220, and a second processing unit 230. The LD processing unit 210, the first processing unit 220, and the second processing unit 230 may be three individual hardware elements within the processing device 20. Alternatively, the LD processing unit 210, the first processing unit 220, and the second processing unit 230 may be three processing cores within the processing device 20.

The LD processing unit 210 serves to obtain the lightness distribution LD of the original images img_ORG. The first processing unit 220 is configured to operate a first computational model 2210 to classify the original images img_ORG as the first WE images img_WE1, BL images img_BL, OE images img_OE, and UE images img_UE. The classification may be performed according to a lightness distribution LD of each of the original images img_ORG.

The second processing unit 230 is configured to operate a second computational model 2320 to correct the BL, OE, and UE images according to their exposure types respectively. The second processing unit 230 may further include a perceptual parameters and structural parameters extractor (referred to as a "PP/SP extractor"), and the PP/SP extractor 2310 is used to extract a plurality of perceptual parameters PP and structural parameters SP of each of the original images img_ORG. When correcting the BL, OE, and UE images, the second computational model 2320 is utilized to adjust the perceptual parameters PP and structural parameters SP of the BL, OE, and UE images.

The output device 40 is coupled to the processing device 20 to receive the first WE images img_WE1 and the second WE images img_WE2. Furthermore, the output device 40 provides the first WE images img_WE1 and the second WE images img_WE2 as the output images img_OUT. In one example, the correction system 1000 may operate in a human perception condition, and the output device 40 may be an individual display device or an integrated display device within a cabin of the vehicle, a robot, or a handheld device for human perception or inspection.

In another example, the correction system 1000 may operate in a computer vision condition, and the output device 40 may be a storage device (e.g. flash, SRAM, DRAM, SSD, HDD, or cloud storage) that may be further coupled with an external processing device (not shown in FIG. 1). The output images img_OUT may be provided to this external processing device to perform post processing, e.g., object detection. Alternatively, the output device may feed the output images img_OUT back to the processing device 20, and the processing device 20 may further include another processing unit (not shown in FIG. 1) to perform post processing on the output images img_OUT.

The LD processing unit 210 may be an individual element (e.g., a processing core) separated from the first processing unit 220. The LD processing unit 210 is used to obtain values of the lightness LI (i.e., referred to as "lightness values") of each original image img_ORG, and then obtain the lightness distribution LD.

More particularly, the original images img_ORG may have a format of "single channel" (e.g., monochrome or gray) or a format of "multiple channels" (e.g., red, green, and blue (RGB)). When the original images img_ORG have the "single channel" format (e.g., the gray format), the LD processing unit 210 may take the value (e.g., the grayscale value) of a pixel as the lightness value. That is, the values of all pixels are taken as the lightness values of one original image img_ORG. For example, when the original image img_ORG is an 8-bit image, each pixel within one original image img_ORG has an 8-bit value ranging from 0 to 255, which has totally 256 levels. This 8-bit value of each pixel is taken as the lightness value, and each pixel has the lightness value with totally 256 levels. In another example, when the original image img_ORG is a 10-bit image, each pixel has a 10-bit value ranging from 0 to 1023 (i.e., with totally 1024 levels). This 10-bit value of each pixel is taken as the lightness value which has totally 1024 levels.

When the original images img_ORG have the "multiple channels" format, the LD processing unit 210 may perform a color space conversion to obtain the lightness value. In one example, when the original images img_ORG have the RGB format, an equation is performed to convert RGB to the single channel format (e.g. grayscale): $p_Y=0.299p_R+0.587p_G+0.114p_B$ where $p_Y$, $p_R$, $p_G$, and $p_B$ represent the values of gray, red, green, and blue of pixel p, respectively. The same equation is also applied to obtain the lightness values when converting RGB to YCbCr or YIQ color spaces. In another example, a color space conversion is performed to covert RGB to HSL (i.e., hue HU, saturation SA, and lightness LI) to obtain the lightness value. Alternatively, another type of color space conversion may be performed to covert RGB to HCL (i.e., hue HU, chroma, and lightness LI) to obtain the lightness value. Furthermore, still other types of color space conversions may be performed to convert RGB to CIE Lab or CIE Luv.

After the lightness values are obtained (either directly taking the grayscale values as the lightness values in the case of single channel format, or converting RGB to single channel format or other color spaces, e.g. HSL or CIE Lab, to obtain the lightness values in the case of multiple channels format), the LD processing unit 210 obtains a "histogram" of the lightness values to form the lightness distribution LD, as will be described in the following paragraphs by reference to FIGS. 2A-1, 2A-2, 2B, 2C, and 2D.

Figures 1, 2A:
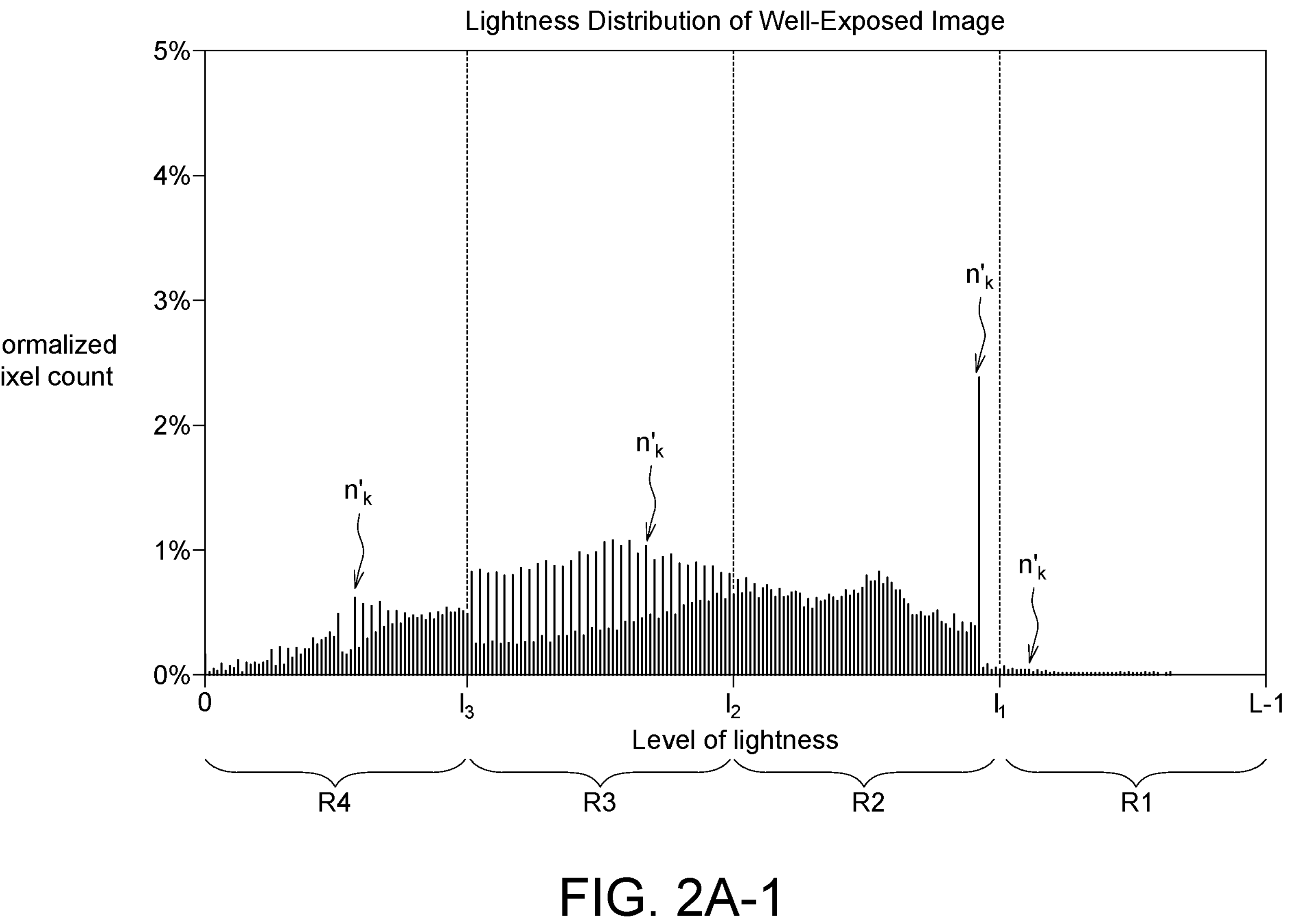

Referring to FIG. 2A-1, which illustrates a lightness distribution of a WE image that has L levels of lightness. The WE image is taken as an example to describe the lightness distribution LD, and similar descriptions may be applied to other exposure types, i.e., the BL (as shown in FIG. 2B), OE (as shown in FIG. 2C), and UE (as shown in FIG. 2D) images. The lightness distribution LD of the image may be expressed by the histogram of the lightness values of all pixels. When the lightness value has totally L levels, the lightness value ranges from 0 to (L−1). At each level k (i.e., k=0, 1, . . . , (L−1)) of the lightness value, a corresponding pixel count $n_k$ is obtained. The pixel count $n_k$ indicates the number of pixels having the lightness value of that level k. The levels of lightness LI can be grouped to bins. For example, in 8-bit images, the number of bins is 256 when the size of bin is one (i.e., each bin contains one level); or the number of bins is 128 when the size of bin is two (i.e., each bin contains two levels); and so on. The size of bin is suggested to be power of two. For example, when each bin contains two levels, the pixel count of the first bin is the sum of the pixel count of level 0 and level 1; the pixel count of the second bin is the sum of the pixel count of level 2 and level 3; and so on. The lightness distribution LD of the image may be expressed by the histogram of the pixel count of all bins. The following paragraphs use one level per bin as examples.

At each level k of the lightness value, a corresponding normalized pixel count n'k is obtained through dividing the pixel count $n_k$ by a total number N of pixels of one image. The total number N of pixels is related to the resolution of the image. When the image has a resolution of (W×H) where "W" indicates the number of vertical columns of pixels (i.e., the width of the image) and "H" indicates the number of horizontal rows of pixels (i.e., the height of the image), the total number N of pixels is equal to W multiplied by H. Such as, when the image has a resolution of (320×400), the total number N of pixels is equal to "128000". The normalized pixel count n'k is obtained by equation (1-1).

$$n'_k = \frac{n_k}{W \times H} \tag{1-1}$$

The normalized pixel count n'k at a corresponding level k is taken as a "distribution value" at that level. The distribution values at all levels (i.e., all levels from 0 to (L−1)) form the lightness distribution LD of the image, where the lightness distribution LD is a normalized lightness distribution.

Figure 3A:
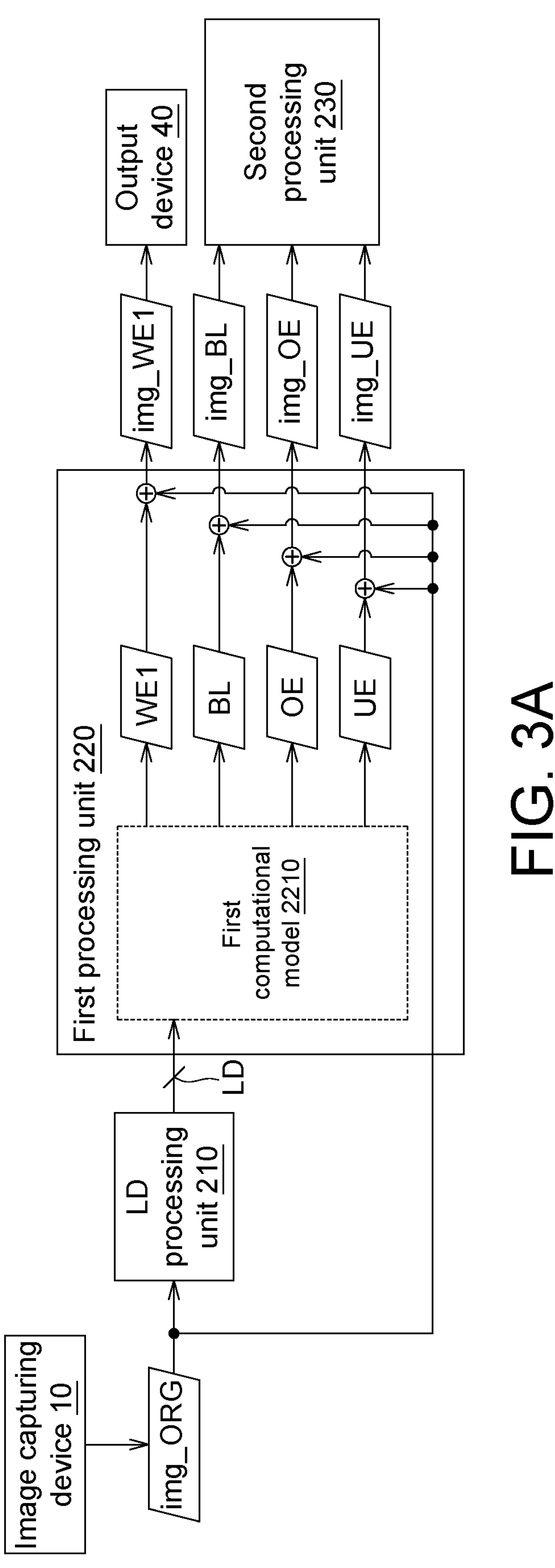
FIG. 3A illustrates an operation of the first processing unit 220 and the first computational model 2210 in an execution stage.

Referring to FIG. 3A, which illustrates an operation of the first processing unit 220 and the first computational model 2210 in an execution stage. The first computational model 2210 may have two operating stages, including a training stage and the execution stage. In the execution stage, the first processing unit 220 operates the first computational model 2210 to classify the exposure types of original images img_ORG as WE1, BL, OE, and UE based on the lightness distribution LD provided by the LD processing unit 210. These exposure types WE1, BL, OE, and UE are treated as labels and attached to the original images img_ORG to form images img_WE1, img_BL, img_OE, and img_UE which are labeled. The first computational model 2210 may have a form of a pre-defined ranges of LD, a machine learning classifier, or a neural network (NN). The machine learning classifier may be K-nearest neighbors (KNN), support vector machine (SVM), or random forest. The neural network may be a convolutional neural network (CNN), a recurrent neural network (RNN), or a deep neural network (DNN).

When the first computational model 2210 has a form of a pre-defined ranges of LD, several ranges are defined in the levels of the lightness LI, and these ranges are used to identify the exposure types of the image. In the example of FIG. 2A-1, four ranges R1, R2, R3, and R4 are defined in the levels of the lightness LI. The coverage of R1-R4 may be equal or unequal. In one example, any adjacent two of the ranges R1-R4 may not overlap each other. Such as, the range R1 has a coverage including levels from $l_1$ to (L−1), the range R2 has a coverage including levels from $l_2$ to $(l_1-1)$, the range R3 has a coverage including levels from $l_3$ to $(l_2-1)$, and the range R4 has a coverage including levels from 0 to $(l_3-1)$.

Given the definition of the ranges R1-R4, a "total distribution value" for each range is obtained by summing the distribution values at all levels within that range. For example, the total distribution value $n_{R1}$ of the range R1 is obtained by summing the distribution values (i.e., the normalized pixel count $n'_k$) at the levels $l_1$ to (L−1) within the range R1, as shown in equation (1-2).

$$n_{R1} = \sum_{k=l_1}^{L-1} n'_k \tag{1-2}$$

Similar descriptions may be applied to obtain the total distribution values $n_{R2}$-$n_{R4}$, as shown in equations (1-3) to (1-5). Such as, the total distribution value $n_{R2}$ of the range R2 is obtained by summing the normalized pixel count $n'_k$ at the levels from $l_2$ to ($l_1$−1) within the range R2, the total distribution value n R3 of the range R3 is obtained by summing the normalized pixel count $n'_k$ at the levels from $l_3$ to ($l_2$−1) within the range R3, and the total distribution value $n_{R4}$ of the range R4 is obtained by summing the normalized pixel count $n'_k$ at the levels from 0 to ($l_3$−1) within the range R4.

$$n_{R2} = \sum_{k=l_2}^{l_1-1} n'_k \tag{1-3}$$

$$n_{R3} = \sum_{k=l_3}^{l_2-1} n'_k \tag{1-4}$$

$$n_{R4} = \sum_{k=0}^{l_3-1} n'_k \tag{1-5}$$

In one example, when the image is an 8-bit image, each pixel of the image has an 8-bit value ranging from 0 to 255. Hence, the lightness LI has totally 256 levels (i.e., L=256), and the lightness value ranges from 0 to 255. Accordingly, four non-overlapping ranges R1, R2, R3, and R4 are defined in the 256 levels of the lightness LI each having an equal coverage including 64 levels. That is, the range R4 has a coverage including levels from 0 to 63, the range R3 has a coverage including levels from 64 to 127, the range R2 has a coverage including levels from 128 to 191, and the range R1 has a coverage including levels from 192 to 255. Therefore, the total distribution values $n_{R1}$-$n_{R4}$ of the ranges R1-R4 are obtained by summing the normalized pixel count $n'_k$ at the levels from 192 to 255, the levels from 128 to 191, the levels from 64 to 127, and the levels from 0 to 63 respectively, as shown in equations (2-1) to (2-4).

$$n_{R1} = \sum_{k=192}^{255} n'_k \tag{2-1}$$

$$n_{R2} = \sum_{k=128}^{191} n'_k \tag{2-2}$$

$$n_{R3} = \sum_{k=64}^{127} n'_k \tag{2-3}$$

$$n_{R4} = \sum_{k=0}^{63} n'_k \tag{2-4}$$

The exposure types of the image (i.e., the original images img_ORG) are identified based on the total distribution values $n_{R1}$-$n_{R4}$ of the ranges R1-R4.

Figures 2, 2A:
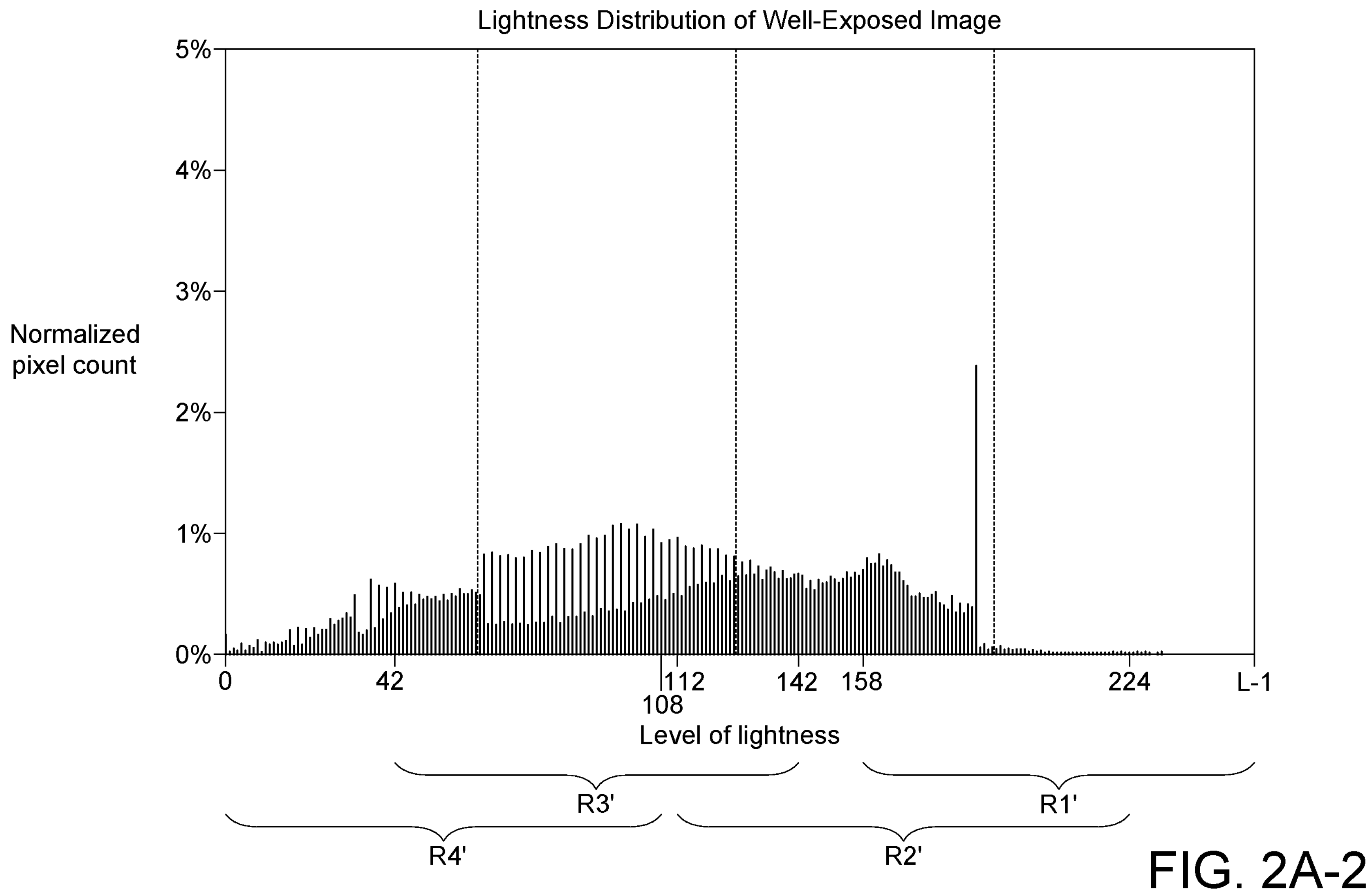
Figure 2B:
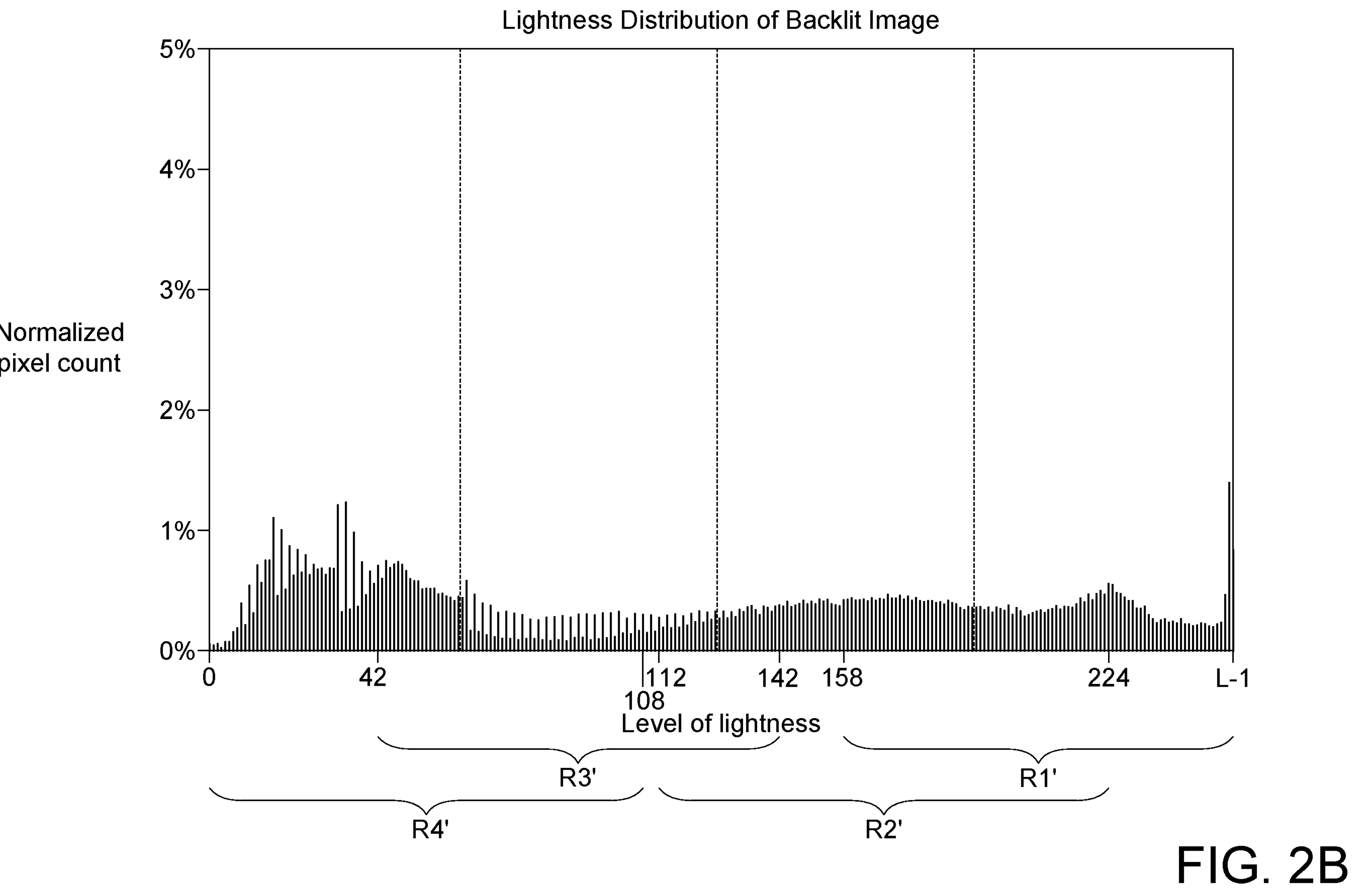
FIG. 2B illustrates a lightness distribution of a BL image.
Figure 2C:
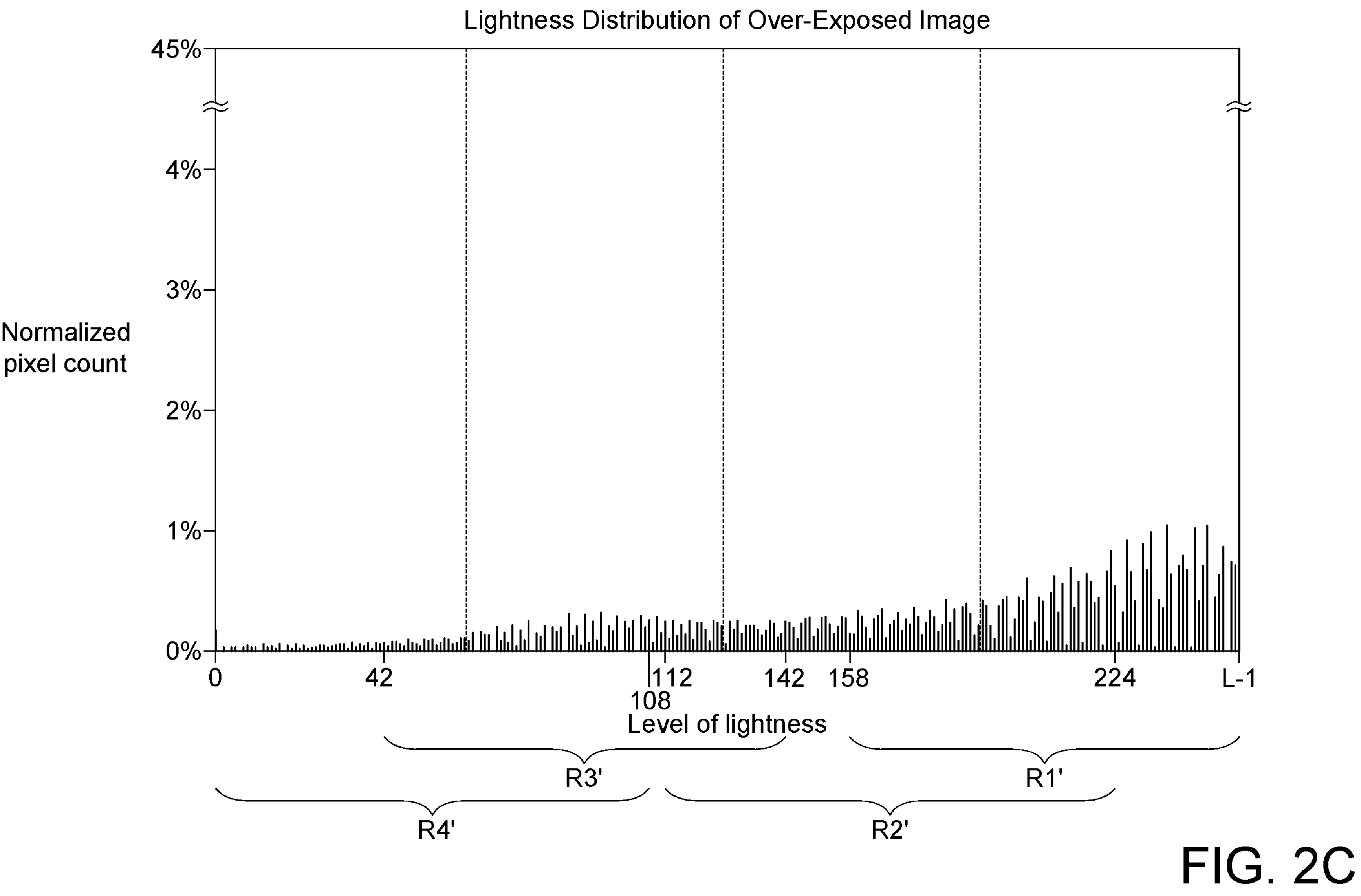
FIG. 2C illustrates a lightness distribution of an OE image.
Figure 2D:
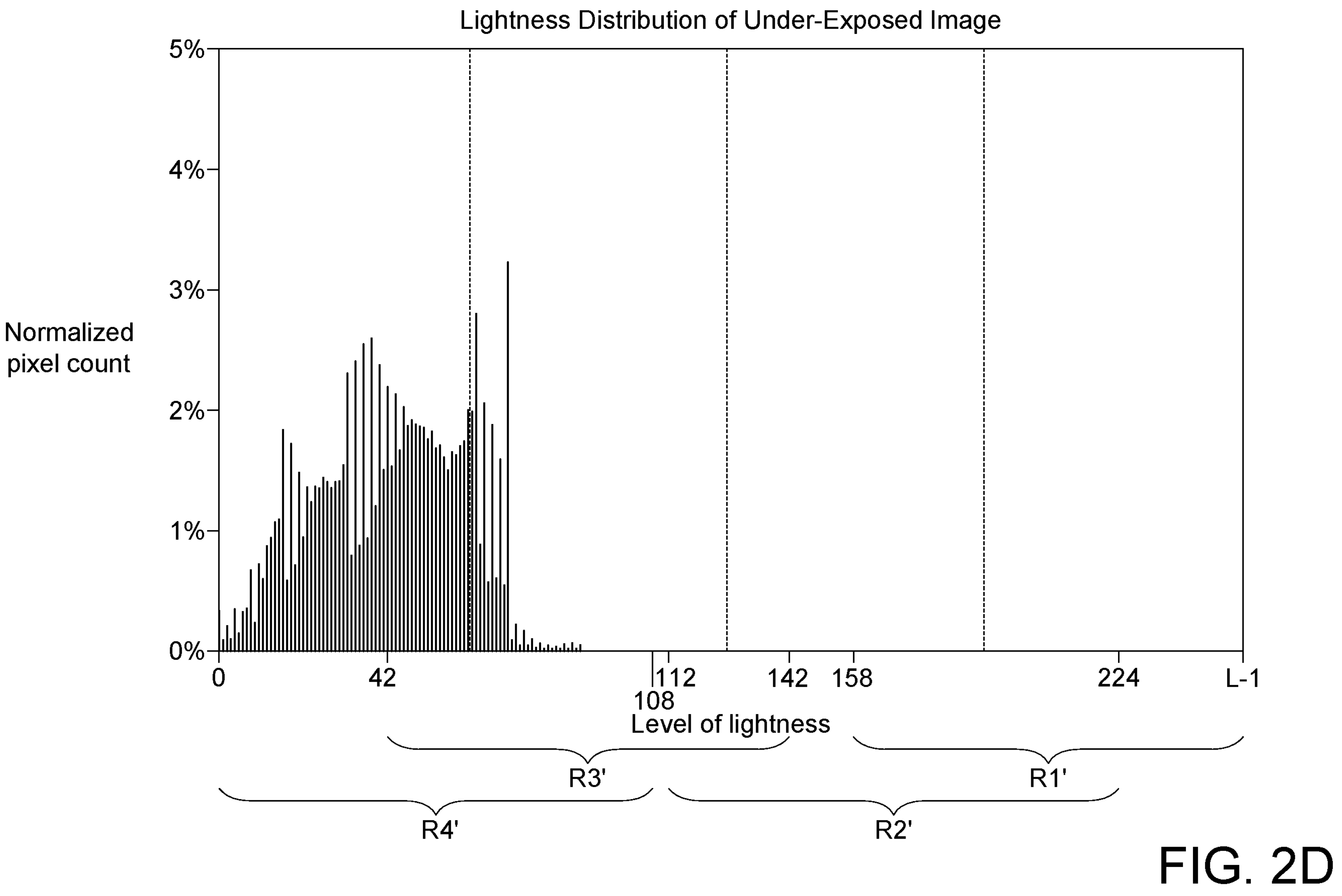
FIG. 2D illustrates a lightness distribution of a UE image.

Referring to FIG. 2A-2 which illustrates the lightness distribution of the WE image with other range coverages. In the example of FIG. 2A-2, each of the ranges R1'-R4' may be defined as selectively overlapping its adjacent range(s). That is, the range R1' may selectively overlap its adjacent range R2', the range R2' may selectively overlap its adjacent ranges R1' and R3', the range R3' may selectively overlap its adjacent ranges R2' and R4', and the range R4' may selectively overlap its adjacent range R3'. When overlapping with adjacent range(s), the ranges R1'-R4' of FIG. 2A-2 have greater coverages compared with the ranges R1-R4 of FIG. 2A-1. In addition, the ranges R1'-R4' may have coverages not equal to one another.

For example, the range R1' has a greater (i.e., "enlarged") coverage (compared with the range R1 in FIG. 2A-1) from the maximum level "(L−1)" down to the level "158", and such an "enlarged" range R1' may overlap its adjacent range R2'. When the image is an 8-bit image, the maximum level "(L−1)" may be equal to "255". Likewise, the range R2' has a greater coverage (compared with the range R2 in FIG. 2A-1) from the level "224" down to the level "112", and the enlarged range R2' overlaps its adjacent ranges R1' and R3'. Furthermore, the range R3' has a greater coverage (compared with the range R3 in FIG. 2A-1) from the level "142" down to the level "42", and the enlarged range R3' overlaps its adjacent ranges R2' and R4'. Moreover, the range R4' has a greater coverage (compared with the range R4 in FIG. 2A-1) from the level "108" down to the minimum level "0", and the enlarged range R4' overlaps its adjacent range R3'.

Provided the above definitions of such "enlarged" ranges R1'-R4', the total distribution values $n_{R1'}$-$n_{R4'}$ of the ranges R1'-R4' are obtained by summing the normalized pixel count $n'_k$ at the levels from 158 to (L−1), the levels from 112 to 224, the levels from 42 to 142, and the levels from 0 to 108 respectively, as shown in equations (3-1) to (3-4).

$$n_{R1'} = \sum_{k=158}^{(L-1)} n'_k \tag{3-1}$$

$$n_{R2'} = \sum_{k=112}^{224} n'_k \tag{3-2}$$

$$n_{R3'} = \sum_{k=42}^{142} n'_k \tag{3-3}$$

$$n_{R4'} = \sum_{k=0}^{108} n'_k \tag{3-4}$$

Referring to FIG. 2B which illustrates a lightness distribution of a BL image. The definitions of the ranges R1'-R4' and their respective total distribution values $n_{R1'}$-$n_{R4'}$ are similar to those of FIG. 2A-2. In the execution stage, the first processing unit 220 operates the first computational model 2210 to perform the classification based on the total distribution values $n_{R1'}$-$n_{R4'}$ of the ranges R1'-R4'. In the example of FIG. 2B, the total distribution value $n_{R1'}$ of the range R1' and the total distribution value $n_{R4'}$ of the range R4' are summed up to compare with a sum of the total distribution value $n_{R2'}$ of the range R2' and the total distribution value $n_{R3'}$ of the range R3'. When the sum of the total distribution values of the ranges R1' and R4' is greater than the sum of the total distribution values of the ranges R2' and R3' (as shown in equation (4-1)), the interested original image (i.e., the original image which is currently analyzed) is classified as the BL image.

$$(n_{R1'} + n_{R4'}) > (n_{R2'} + n_{R3'}) \tag{4-1}$$

Referring to FIG. 2C which illustrates a lightness distribution of an OE image. The definitions of the ranges R1'-R4' and their respective total distribution values $n_{R1'}$-$n_{R4'}$ are similar to those of FIG. 2A-2. When the total distribution value $n_{R1'}$ of the range R1' is greater than the sum of the total distribution values $n_{R2'}$, $n_{13'}$, and $n_{R4'}$ of the ranges R2', R3' and R4', the currently analyzed original image is classified as the OE image, as shown in equation (4-2).

$$n_{R1'} > (n_{R2'} + n_{R3'} + n_{R4'}) \quad (4\text{-}2)$$

Referring to FIG. 2D which illustrates a lightness distribution of a UE image. The definitions of the ranges R1'-R4' and their respective total distribution values $n_{R1'}$-$n_{R4'}$ are similar to those of FIG. 2A-2. When the total distribution value $n_{R4'}$ of the range R4' is greater than the sum of the total distribution values $n_{R1'}$ and $n_{R2'}$ of the ranges R1' and R2', the currently analyzed original image is classified as the UE image, as shown in equation (4-3).

$$n_{R4'} > (n_{R1'} + n_{R2'}) \quad (4\text{-}3)$$

The above-mentioned criteria for identifying the exposure types in the classification may be applied for different definitions of the ranges of levels of the lightness LI. Such as, the criteria expressed in equations (4-1) to (4-3) may be applied to the ranges R1-R4 (i.e., each having an equal coverage) in the examples of FIGS. 2A-1.

Referring back to FIG. 2A-2, the lightness distribution LD of the WE image may have a different histogram from those of the BL, OE, and UE images shown in FIGS. 2B, 2C, and 2D respectively. When the total distribution values $n_{R1'}$-$n_{R4'}$ in the lightness distribution LD of FIG. 2A-2 do not satisfy the criteria of equations (4-1) to (4-3), the currently analyzed original image img_ORG is not classified as the BL, OE, and UE types. Consequently, this original image img_ORG is classified as the WE type, which forms the first WE image img_WE1.

When the first computational model 2210 has a form of a machine learning classifier (e.g., KNN, SVM, or random forest) or a neural network (e.g., CNN, DNN, or RNN), these classifiers or neural networks may classify the features of the input LD and then decide the exposure type. Referring to FIG. 3B, which illustrate a DNN structure of the first computational model 2210. The DNN structure includes an input layer 2211, a hidden layer 2212, and an output layer 2213. The input layer 2211 may have totally 256 nodes when the lightness values are 8 bits. Furthermore, the hidden layer 2212 may have several sub-layers. Moreover, the output layer 2213 may have totally four nodes related to the exposure types of WE, BL, OE, and UE. The first computational model 2210 may perform the classification based on maximum probability. The first computational model 2210 receives the lightness distribution LD from the LD processing unit 210. The lightness distribution LD is fed into the input layer 2211. Then, processing is performed in the hidden layer 2212 with activation functions (e.g. ReLu) to classify the features of LD. Then, at the output layer 2213, LogSoftMax or other similar functions are used to compute the probability. The maximum probability is selected as the exposure type. For example, when nodes 0, 1, 2, and 3 correspond to the probability of WE (0.4), BL (0.3), OE (0.2), and UE (0.1), respectively, the exposure type is WE because its probability 0.4 is the largest.

Figure 4:
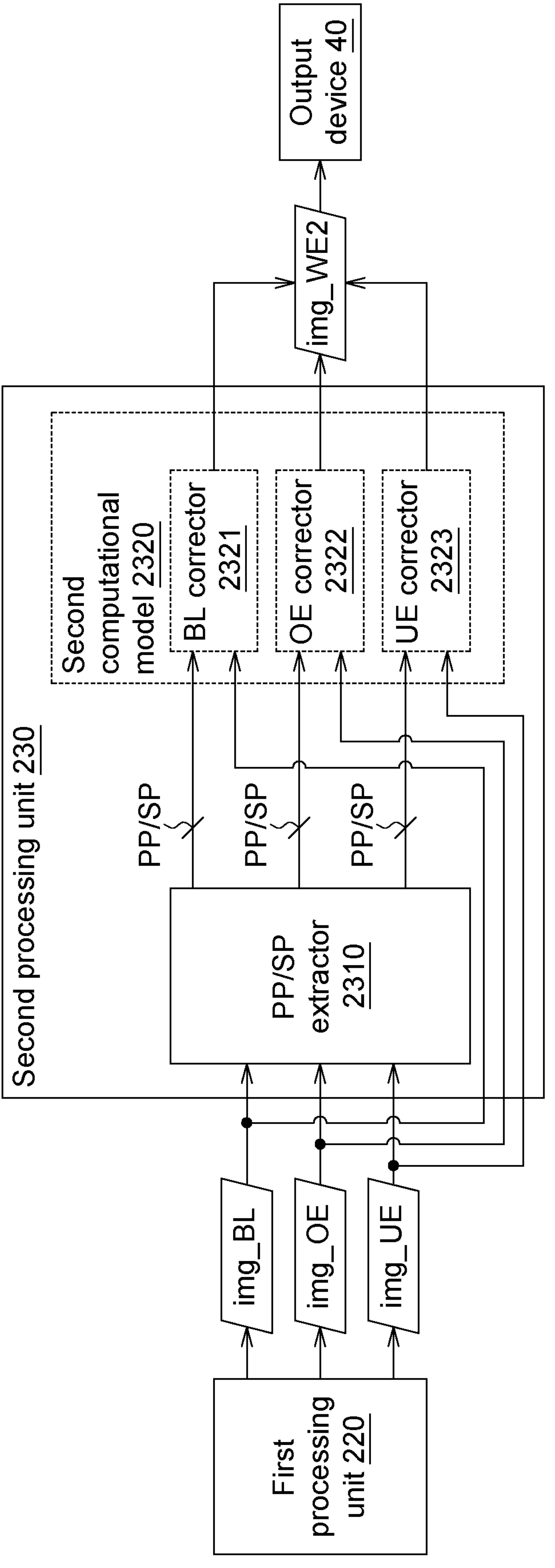
FIG. 4 illustrates an operation of the second processing unit 230 and the second computational model 2320 in an execution stage.

Referring to FIG. 4 which illustrates an operation of the second processing unit 230 and the second computational model 2320 in an execution stage. The second computational model 2320 may also have two operating stages, including a training stage and the execution stage. In the execution stage, the second processing unit 230 operates the second computational model 2320 to correct the IE images (i.e., the BL, OE, and UE images) in the original images img_ORG to obtain the second WE images img_WE2. More particularly, the PP/SP extractor 2310 extracts the perceptual parameters PP and structural parameters SP of each of the BL images img_BL, the OE images img_OE, and the UE images img_UE. Then, the IE images with extracted perceptual parameters PP and structural parameters SP are provided to the second computational model 2320. The perceptual parameters PP include a set of parameters: lightness LI, hue HU, and saturation SA. The structural parameters SP include a set of parameters: edge EG, similarity SI, and smoothness SM.

The second computational model 2320 may have a form of a neural network with multiple layers, such as the CNN, the RNN, or the DNN. The input layer reads single channel or multi-channel images, not normalized lightness distribution. The hidden layer consists of PP/SP extractor 2310 and several sub-models of BL corrector 2321, OE corrector 2322, and UE corrector 2323. The PP/SP extractor 2310 may be a form of nested U structure that is able to extract global and local features effectively by a combination of convolution, maxpool, and upsampling. The second processing unit 230 operates the BL, OE, and UE correctors 2321, 2322, and 2323 to correct the BL, OE, and UE images respectively. More particularly, the BL corrector 2321 is operated to adjust the extracted perceptual parameters PP and structural parameters SP of the BL images img_BL. The OE corrector 2322 is operated to adjust the extracted perceptual parameters PP and structural parameters SP of the OE images img_OE. Likewise, the extracted perceptual parameters PP and structural parameters SP of the UE images img_UE are adjusted by the UE corrector 2323. Through the corrections performed by the BL, OE, and UE correctors 2321, 2322, and 2323, the BL, OE, and UE images are corrected to obtain the second WE images img_WE2. Then, the obtained second WE images img_WE2 are provided to the output device 40.

Referring to Table. 1 which illustrates overall processing time of the execution stages of the first computational model 2210 and the second computational model 2320 for performing classification and correction. When performing classification and correction, the processing device 20 is fed with original images img_ORG having various resolutions. Such as, several different resolutions, from the highest to the lowest, of (1852×1852), (855×1282), (920×614), (764×765), (320×400) and (448×296). Given measurements when practicing the correction system 1000, the overall processing time of classification and correction are recorded as 30 ms, 26 ms, 24 ms, 23 ms, 22 ms, and 13 ms respectively, corresponding to these resolutions.

TABLE 1

| Resolution | Processing time (ms) |
|---|---|
| 1852 × 1852 | 30 |
| 855 × 1282 | 26 |
| 920 × 614 | 24 |
| 764 × 765 | 23 |
| 320 × 400 | 22 |
| 448 × 296 | 13 |

Figure 5A:
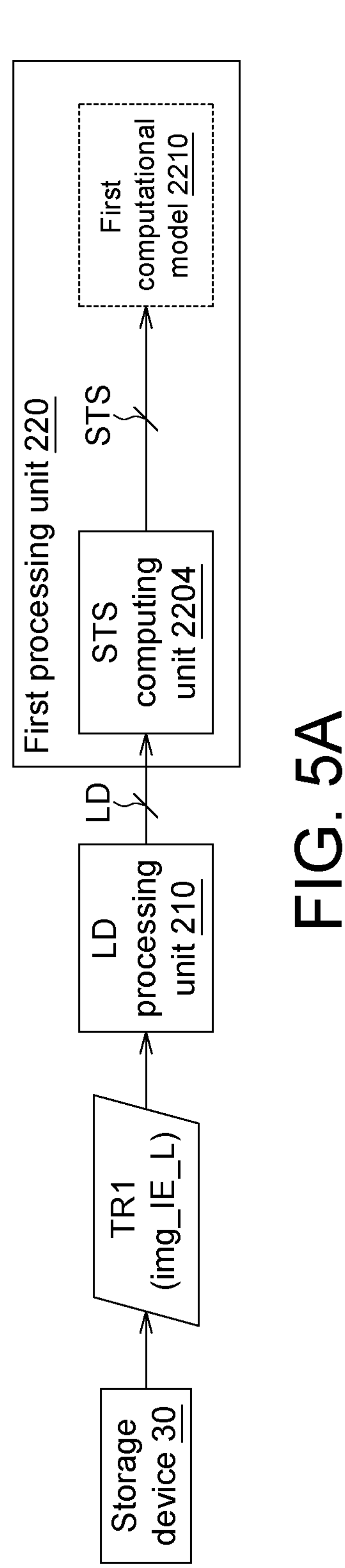
FIG. 5A illustrates an operation of the first processing unit 220 and the first computational model 2210 in a training stage.

Referring to FIG. 5A which illustrates an operation of the first processing unit 220 and the first computational model 2210 in the training stage. The first computational model 2210 is trained by a first set of training images TR1 so as to adjust the ranges R1'-R4' (shown in FIGS. 2A-2, 2B, 2C, and 2D) in the lightness distribution LD. The same training scheme may be applied to the ranges R1-R4 (which may not overlap one another) of the example of FIGS. 2A-1.

The first set of training images TR1 may be obtained from the image capturing device 10 or the storage device 30. In one example, the image capturing device 10 captures the original images img_ORG and outputs "exposure values" of each of the original images img_ORG. Based on the exposure values, the original images img_ORG may be labeled with exposure types of OE or UE and may preliminarily identify them as IE images (referred to as a set of "labeled IE images" img_IE_L) to form part of the first set of training images TR1.

Alternatively, the first set of training images TR1 may be obtained from the storage device 30, as shown in FIG. 5A. The original images img_ORG may be labeled by an experienced user to form the first set of training images TR1 which contains the labeled IE images img_IE_L (i.e., including labeled BL, OE, and UE images). When the first computational model 2210 is trained in an off-line manner (in contrast to the execution stage in a real-time manner), the first set of training images TR1 are loaded from the storage device 30 to train the first computational model 2210. In still another example, the labeling for the labeled IE images img_IE_L may be performed by other hardware elements or software applications (not shown in FIG. 5A).

The first set of training images TR1 are then provided to the LD processing unit 210, and the LD processing unit 210 generates the lightness distribution LD (i.e., the normalized lightness distribution) of each of the first set of training images TR1. Then, a set of statistic STS of the lightness distribution LD is obtained for each exposure type of the labeled IE images img_IE_L in the first set of training images TR1. The statistic STS may provide information about statistic characteristic related to the histogram of the lightness distribution LD. The statistics STS may include median, mean, standard deviation, quartiles, percentiles, . . . , etc. An example of statistics STS from 3,000 OE images is illustrated in Table 2.

TABLE 2

| Levels | Image1 | Image2 | Image3 | Image4 | . . . | mean | std | Q1 | Q2 | Q3 |
|---|---|---|---|---|---|---|---|---|---|---|
| 0 | 0.00% | 0.00% | 0.00% | 0.00% | . . . | 0.00% | 0.00% | 0.00% | 0.00% | 0.00% |
| 1 | 0.00% | 0.00% | 0.00% | 0.00% | . . . | 0.00% | 0.00% | 0.00% | 0.00% | 0.00% |
| 2 | 0.01% | 0.00% | 0.00% | 0.00% | . . . | 0.01% | 0.01% | 0.00% | 0.00% | 0.01% |
| 3 | 0.00% | 0.00% | 0.00% | 0.00% | . . . | 0.01% | 0.01% | 0.00% | 0.00% | 0.01% |
| 4 | 0.02% | 0.01% | 0.00% | 0.00% | . . . | 0.03% | 0.05% | 0.00% | 0.00% | 0.03% |
| 5 | 0.01% | 0.00% | 0.00% | 0.00% | . . . | 0.04% | 0.06% | 0.00% | 0.00% | 0.03% |
| . | . | . | . | . | . | . | . | . | . | . |
| . | . | . | . | . | . | . | . | . | . | . |
| . | . | . | . | . | . | . | . | . | . | . |
| 251 | 1.62% | 1.95% | 1.55% | 1.99% | . . . | 1.35% | 0.70% | 1.02% | 1.59% | 1.96% |
| 252 | 1.60% | 2.28% | 1.96% | 2.49% | . . . | 1.50% | 0.83% | 0.95% | 1.78% | 2.08% |
| 253 | 2.06% | 4.25% | 3.16% | 4.41% | . . . | 2.13% | 1.55% | 0.75% | 1.86% | 3.43% |
| 254 | 2.08% | 5.38% | 4.90% | 7.22% | . . . | 2.99% | 2.36% | 0.79% | 2.19% | 5.02% |
| 255 | 29.96% | 41.96% | 9.71% | 29.89% | . . . | 19.06% | 13.34% | 6.25% | 17.24% | 29.90% |

In Table 2, "Levels" represents the levels of the lightness LI, "std" represents standard deviation, Q1 represents the first quartile (also known as lower quartile or 25th percentile), Q2 represents the second quartile (also known as median or 50th percentile), and Q3 represents the third quartile (also known as upper quartile or 75th percentile). In addition to these statistics, other percentiles such as 10th, 15th, 85th, or 90th can be adopted. Q1, Q2, Q3, or percentiles may be adopted for defining the coverages of ranges. Mean (μ) and standard deviation (σ) may be combined (e.g., μ±σ, μ±2σ, μ±3σ) for distinguishing the LD among different exposure types. For example, a level (Lw) may be picked above the middle level (L/2) that has the largest mean. The level (Lw) combined with the standard deviation may set the coverage of R1. Another level (Lb) may be picked below the middle level (L/2) that has the largest mean. The level (Lb) combined with the standard deviation may set the coverage of R4. Similarly, a level (Lq) may be picked between Q1 and Q2 that has the largest mean. The level (Lq) combined with the standard deviation may set the coverage of R3. In one example, the first processing unit 220 may include a hardware element referred to as a STS computing unit 2204, and the STS computing unit 2204 is configured to perform statistic computation on the lightness distribution LD to obtain the statistic STS.

Then, the statistic STS may be provided to the first computational model 2210. In the training stage of the first computational model 2210, the ranges R1'-R4' in the lightness distribution LD are adjusted based on the statistic STS. Such as, the ranges R1'-R4' may be adjusted to cover different levels of the lightness LI. Such as, the range R1' may be adjusted to have a greater coverage to include more levels of the lightness LI, while the coverage of the range R2' may be adjusted to be reduced. In one example, the statistic STS may be associated with an error function, and the error function may provide an error value. When adjusting the coverages of the ranges R1'-R4', different values of errors may be obtained through the statistic STS. When the error achieves a predefined value (e.g., a small value close to zero), the ranges R1'-R4' are adjusted to achieve desirable coverages, and the first computational model 2210 is well trained.

Figure 5B:
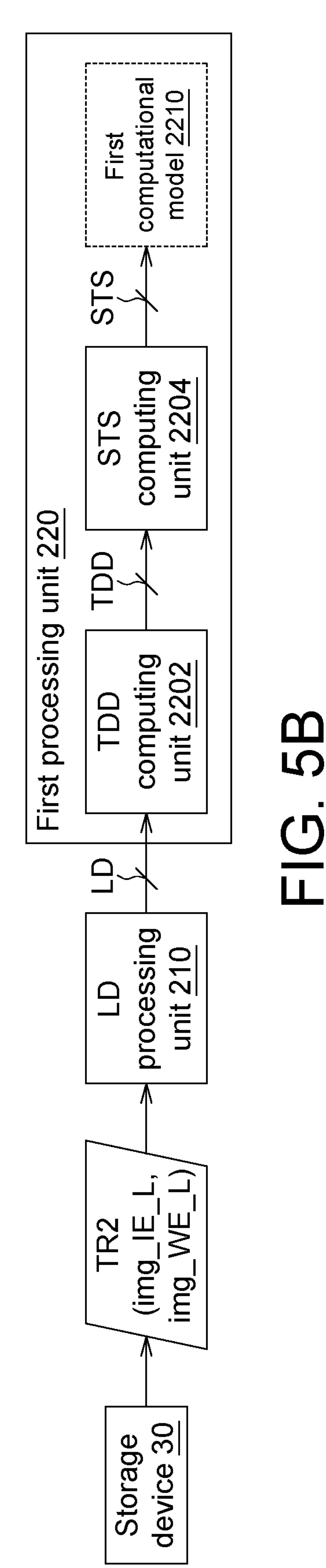
FIG. 5B illustrates another operation of the first processing unit 220 and the first computational model 2210 in the training stage.

Referring to FIG. 5B which illustrates anther operation of the first processing unit 220 and the first computational model 2210 in the training stage. A second set of training images TR2 is utilized to train the first computational model 2210. Compared with the first set of training images TR1 utilized in the example of FIG. 5A, the second set of training images TR2 of this example further include a set of labeled WE images img_WE_L. The labeled WE images img_WE_L and the labeled IE images img_IE_L form a set of image pairs in the second set of training images TR2. The labeled WE images img_WE_L may be obtained by the image capturing device 10 or the storage device 30. Such as, the image capturing device 10 may output exposure values of the original images img_ORG, and identify them as the IE type and the WE type based on the exposure values. The original images img_ORG may be labeled by an experienced user to form the second set of training images TR2.

The second set of training images TR2 are provided to the LD processing unit 210 to obtain their lightness distribution LD. Then, based on the lightness distributions LD in each image pair of the second set of training images TR2, a total distribution difference TDD between the labeled IE image img_IE_L and the labeled WE image img_WE_L in each image pair is obtained. The total distribution difference TDD is used to identify the exposure types of the labeled IE images img_IE_L. In one example, the first processing unit 220 may further include a TDD computing unit 2202 configured to perform signal processing on the lightness distribution LD to obtain the total distribution difference TDD.

Figure 6A:
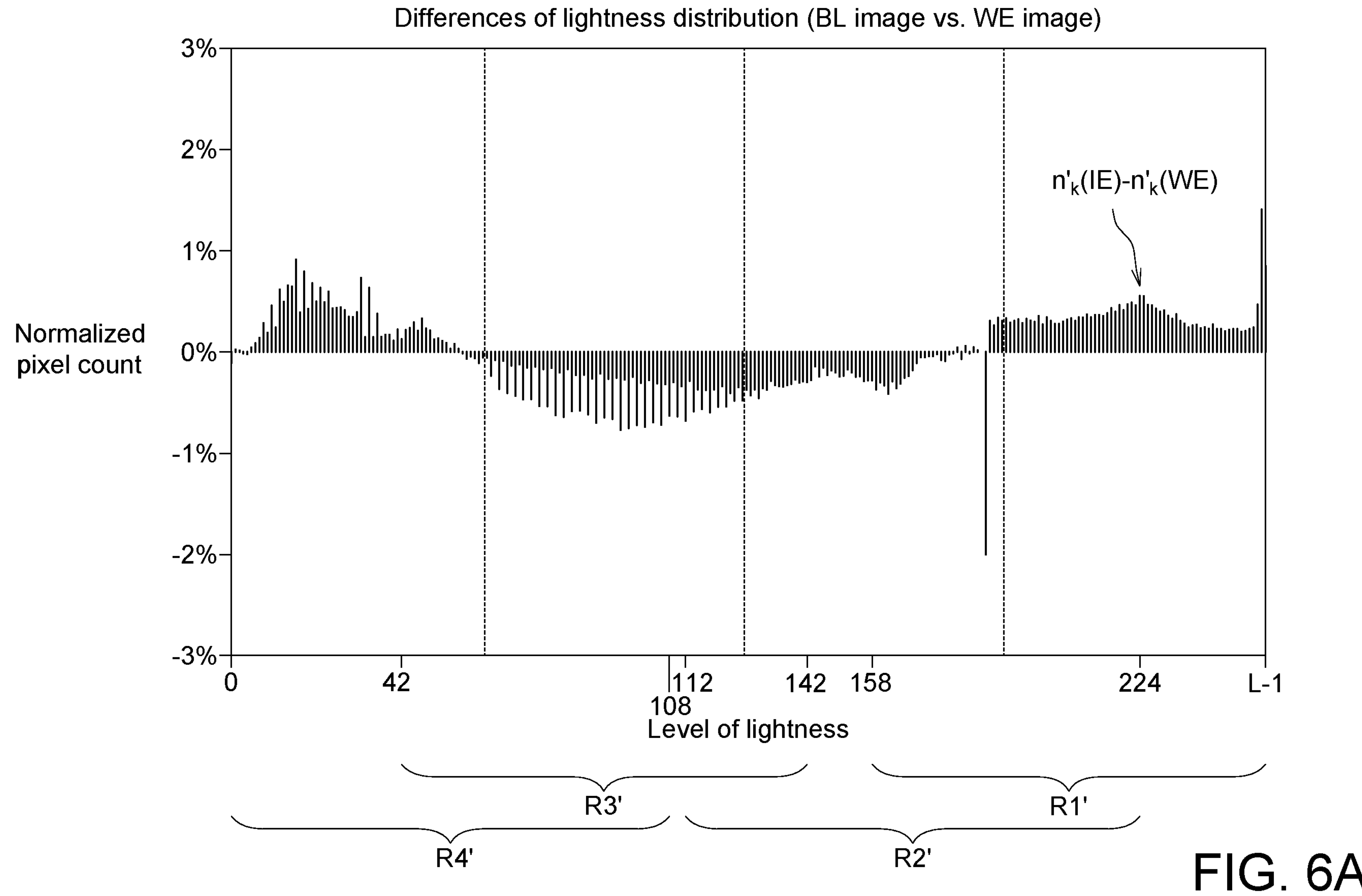
FIG. 6A illustrates the differences between the distribution values of the lightness of a pair of BL image and WE image.

Referring to FIG. 6A which illustrates the differences between the distribution values of the lightness of a pair of BL image and WE image. In the image pair of the second set of training images TR2, a labeled IE image img_IE_L is currently analyzed to identify its exposure type. A distribution difference $D'_k$ at a level k of the lightness LI associated with the image pair is obtained, by subtracting the normalized pixel count $n'_k$(WE) at level k of the labeled WE image img_WE_L from the corresponding normalized pixel count $n'_k$(IE) of the labeled IE image img_IE_L, as shown in equation (5-1).

$$D'_k = n'_k(IE) - n'_k(WE) \tag{5-1}$$

The total distribution difference TDD for a range is obtained, by summing up the distribution differences $D'_k$ at all levels within that range. Such as, the total distribution difference TDD(R1') for the range R1' is obtained by summing up the distribution differences $D'_k$ at levels from 158 to (L−1) within the range R1', as shown in equation (5-2).

$$TDD(R1') = \sum_{k=158}^{(L-1)} D'_k \tag{5-2}$$

Furthermore, as shown in equations (5-3) to (5-5), the total distribution difference TDD(R2') for the range R2' is obtained by summing up the distribution differences $D'_k$ at levels from 112 to 224 within the range R2'. Likewise, the total distribution difference TDD(R3') for the range R3' is obtained by summing up the distribution differences $D'_k$ at levels from 42 to 142 within the range R3', and the total distribution difference TDD(R4') for the range R4' is obtained by summing up the distribution differences $D'_k$ at levels from 0 to 108 within the range R4'.

$$TDD(R2') = \sum_{k=112}^{224} D'_k \tag{5-3}$$

$$TDD(R3') = \sum_{k=42}^{142} D'_k \tag{5-4}$$

$$TDD(R4') = \sum_{k=0}^{108} D'_k \tag{5-5}$$

From another viewpoint, the total distribution difference TDD for a range is obtained by subtracting the total distribution value of the WE image at that range from the corresponding total distribution value of the IE image. Such as, the total distribution difference TDD(R1') of the range R1' is equal to the difference between the total distribution value $n_{R1'}$(WE) of range R1' of the WE image and the corresponding total distribution value $n_{R1'}$(IE) of the IE image, as shown in equation (5-6). The same calculation may be applied to obtain the total distribution difference TDD(R1') to TDD(R4') of the ranges R2'-R4' respectively, as shown in equations (5-7) to (5-9).

$$TDD(R1') = n_{R1'}(IE) - n_{R1'}(WE) \tag{5-6}$$

$$TDD(R2') = n_{R2'}(IE) - n_{R2'}(WE) \tag{5-7}$$

$$TDD(R3') = n_{R3'}(IE) - n_{R3'}(WE) \tag{5-8}$$

$$TDD(R4') = n_{R4'}(IE) - n_{R4'}(WE) \tag{5-9}$$

Based on the total distribution differences TDD(R1') to TDD(R4') of the ranges R1'-R4', the labeled IE images img_IE_L in the second set of training images TR2 are further identified as the BL, OE, and UE types. In the example of FIG. 6A, the TDD computing unit 2202 provides a computation result that, the total distribution differences TDD(R1') and TDD(R4') of the ranges R1' and R4' are both positive values (i.e., greater than zero), while the total distribution differences TDD(R2') and TDD(R3') of the ranges R2' and R3' are both negative values (i.e., less than zero). Therefore, the labeled IE images img_IE_L in the second set of training images TR2 are identified as the BL type.

Figure 6B:
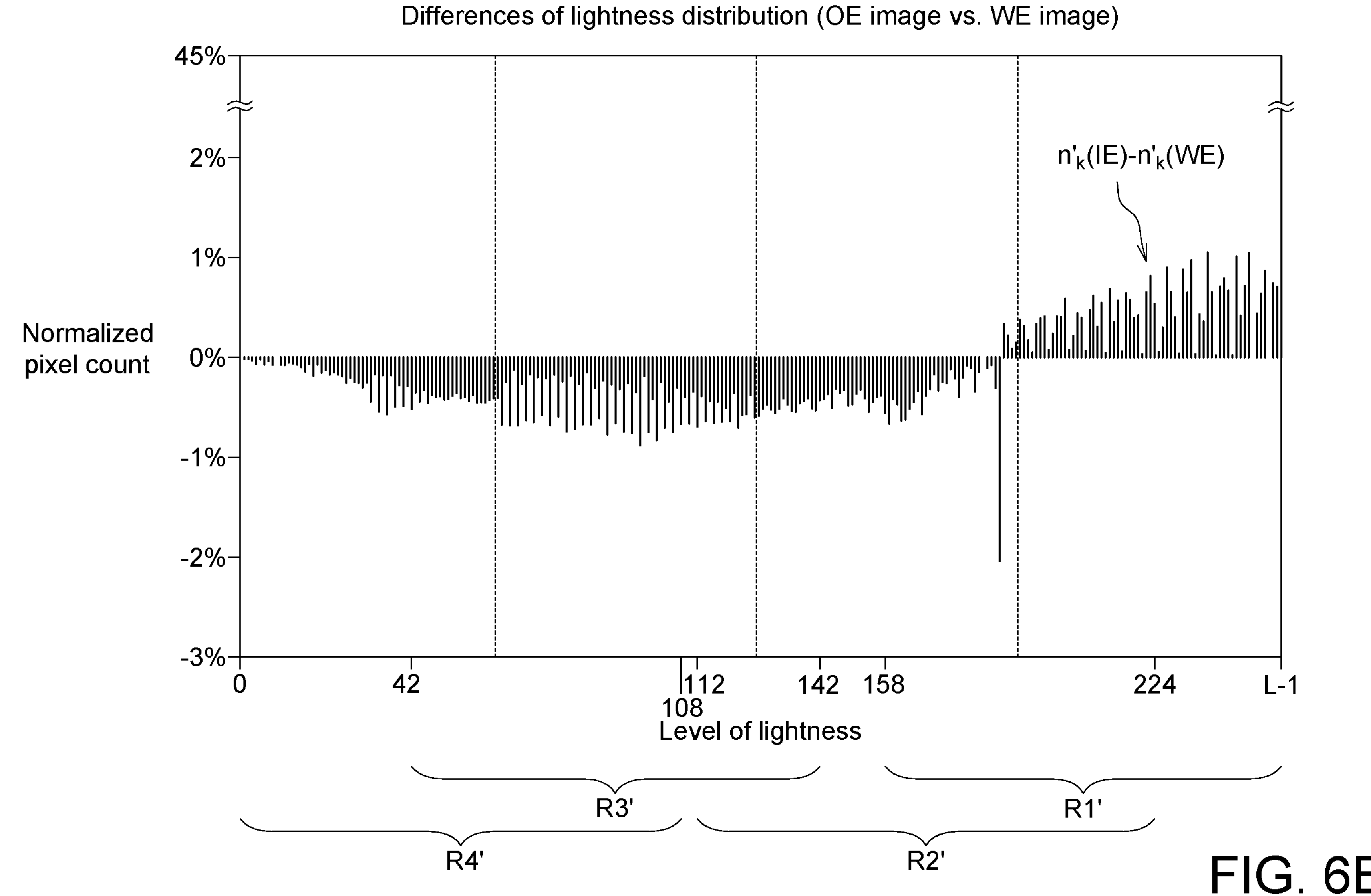
FIG. 6B illustrates the differences between the distribution values of the lightness of a pair of OE image and WE image.

Referring to FIG. 6B which illustrates the differences between the distribution values of the lightness of a pair of OE image and WE image. The TDD computing unit 2202 provides a computation result that, the total distribution difference TDD(R1') of the range R1' is a positive value, while the total distribution differences TDD(R3') and TDD (R4') of the ranges R3' and R4' are both negative values. Therefore, the labeled IE images img_IE_L in the second set of training images TR2 are identified as the OE type.

Figure 6C:
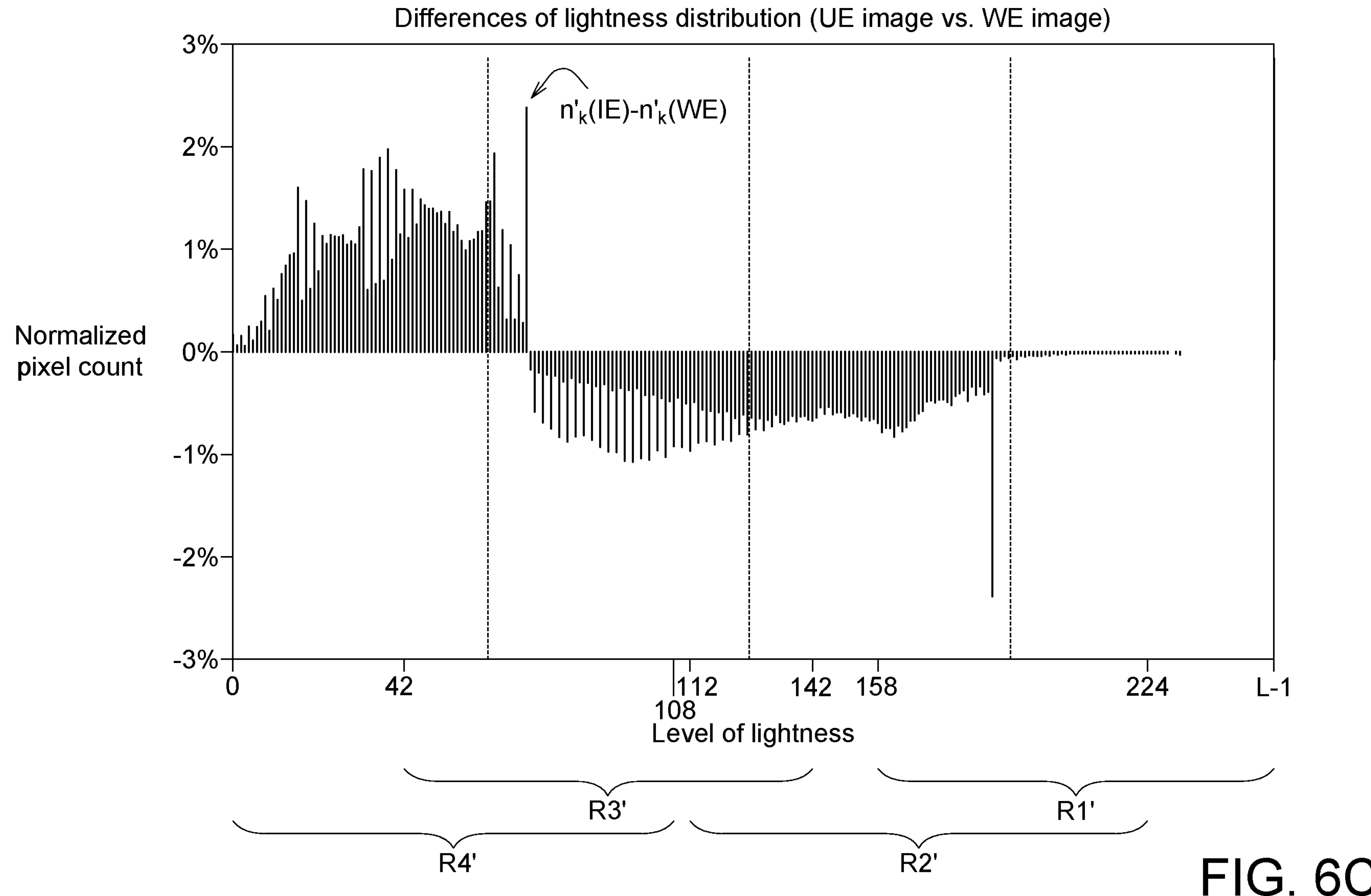
FIG. 6C illustrates the differences between the distribution values of the lightness of a pair of UE image and WE image.

Referring to FIG. 6C which illustrates the differences between the distribution values of the lightness of a pair of UE image and WE image. The TDD computing unit 2202 provides that, the total distribution difference TDD(R4') of the range R4' is a positive value, while the total distribution differences TDD(R1') and TDD(R2') of the ranges R1' and R2' are both negative values. Therefore, the labeled IE images img_IE_L in the second set of training images TR2 are identified as the UE type.

Referring back to FIG. 5B, the TDD computing unit 2202 provides the total distribution difference TDD to the STS computing unit 2204. Then, the STS computing unit 2204 performs statistic computation on the total distribution difference TDD to obtain the statistic STS of the lightness distribution LD. Then, the statistic STS are provided to the first computational model 2210 to adjust the ranges R1'-R4' in the lightness distribution LD.

Figure 7A:
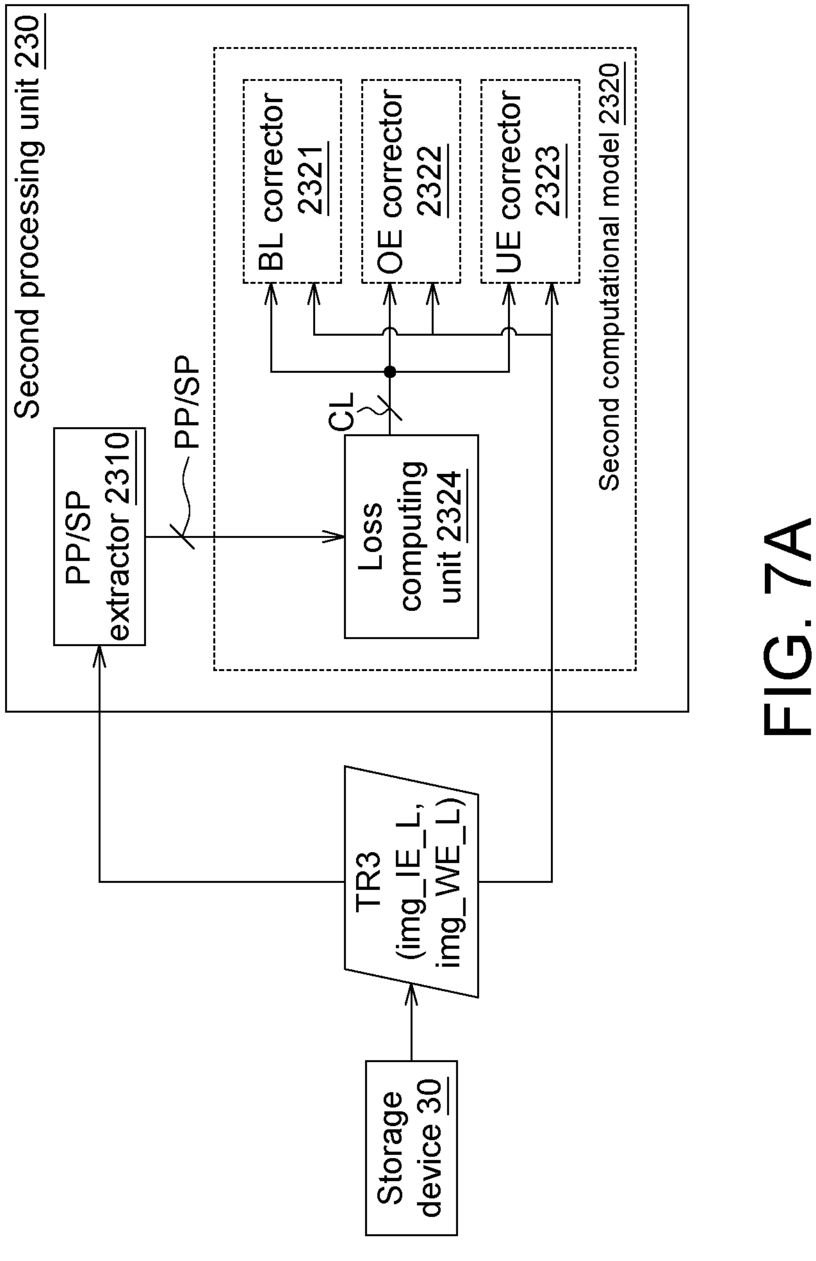
FIG. 7A illustrates an operation of the second processing unit 230 and the second computational model 2320 in a training stage.

Referring to FIG. 7A which illustrates an operation of the second processing unit 230 and the second computational model 2320 in the training stage. The second computational model 2320 is trained by a third set of training images TR3 so as to adjust the internal parameters of the second computational model 2320. Similar to the second set of training images TR2 for training the first computational model 2210, the third set of training images TR3 also include image pairs of labeled IE images img_IE_L and labeled WE images img_WE_L, which may be obtained from the image capturing device or the storage device 30. The third set of training images TR3 are provided to the PP/SP extractor 2310 to extract the perceptual parameters PP and the structural parameters SP and is provided to the BL, OE, and UE correctors 2321, 2322 and 2323 respectively for correction.

A set of losses in each image pair of the third set of training images TR3 are obtained based on the extracted perceptual parameters PP and the structural parameters SP. In one example, the second computational model 2320 may further include an element of loss computing unit 2324 to compute the set of losses. The set of losses may include a combined loss CL which is calculated based on several types of losses, as will be described in the later paragraphs by reference to FIG. 8. Then, the set of losses and/or the combined loss CL are provided to each of the BL, OE, and UE correctors 2321, 2322, and 2323. Based on the set of losses (i.e., including the combined loss CL), the internal parameters for each of the BL, OE, and UE correctors 2321, 2322, and 2323 are respectively adjusted. Such as, when adjusting the internal parameters, the set of losses and the combined loss may have different values. When the combined loss achieves a predefined value (e.g., a small value close to zero), the internal parameters are adjusted to have desirable settings, and the second computational model 2320 is well trained.

Figure 7B:
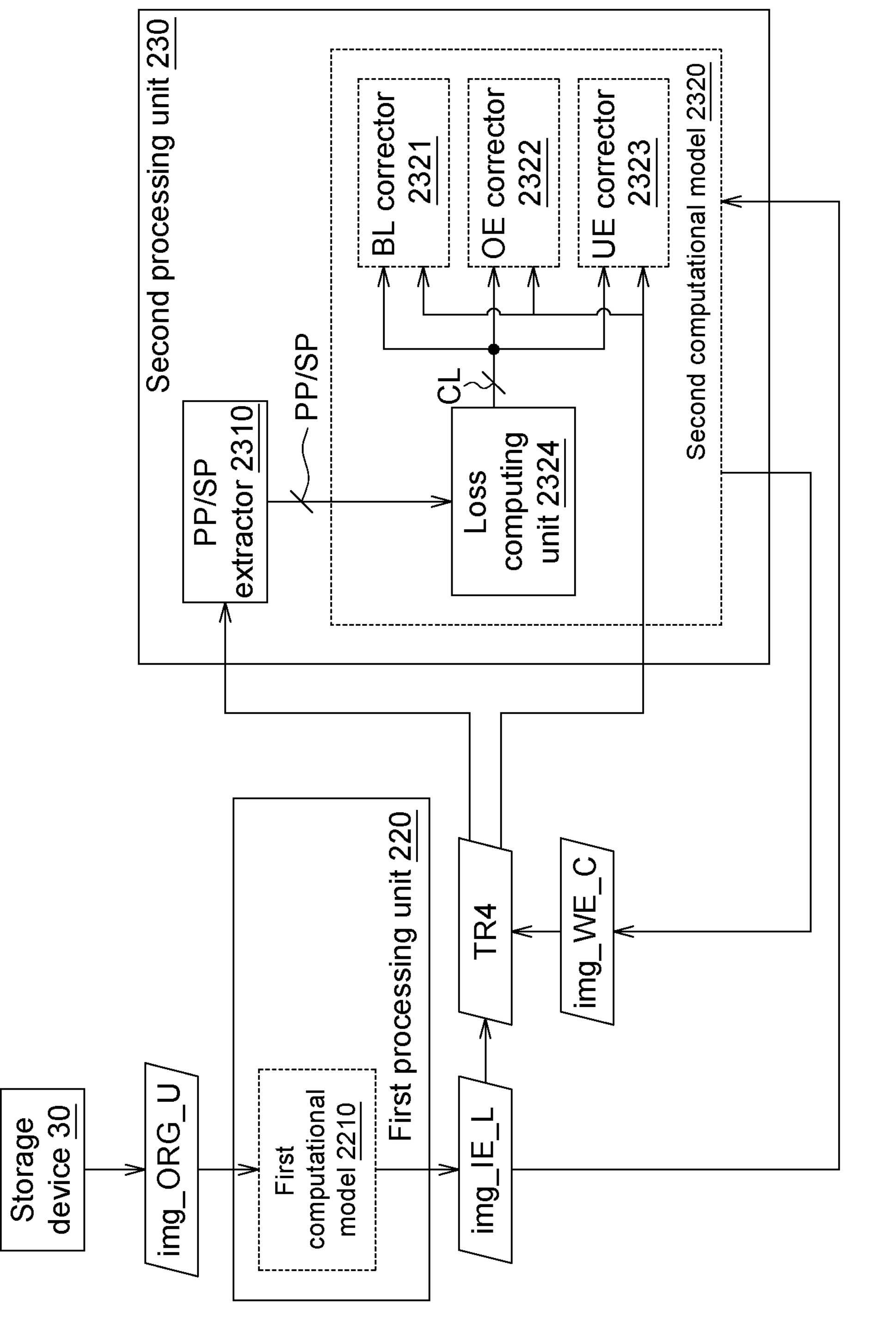
FIG. 7B illustrates another operation of the second processing unit 230 and the second computational model 2320 in the training stage.

Referring to FIG. 7B, which illustrates another operation of the second processing unit 230 and the second computational model 2320 in the training stage. The second computational model 2320 is trained by a fourth set of training images TR4, which include a set of image pairs of labeled IE images img_IE_L and WE candidates img_WE_C. The labeled IE images img_IE_L may be obtained by the first computational model 2210. The WE candidates img_WE_C may be obtained by the second computational model 2320.

More particularly, the image capturing device 10 obtains a series of original images img_ORG without any exposure values. Such original images img_ORG, without any labels, are referred to as "un-labeled images" img_ORG_U. The first computational model 2210 may classify the un-labeled images img_ORG_U as the BL, OE, and UE types, so to obtain the labeled IE images img_IE_L.

Thereafter, the labeled IE images img_IE_L are provided to the second processing unit 230 and the second computational model 2320. The second computational model 2320 is utilized to correct the labeled IE images img_IE_L, by the BL, OE, and UE correctors 2321, 2322 and 2323 respectively, based on the BL, OE, and UE types. Through the correction by the second computational model 2320 the WE candidates img_WE_C are obtained, and then provided to form the fourth set of training images TR4.

Similar to the training scheme of the example of FIG. 7A, the fourth set of training images TR4 are provided to the PP/SP extractor 2310 to extract the perceptual parameters PP and the structural parameters SP thereof and provided to BL, OE, and UE correctors 2321, 2322 and 2323 respectively for correction. Then, the loss computing unit 2324 obtains the set of losses (including the combined loss CL) for each image pair in the fourth set of training images TR4. Then, the internal parameters of the second computational model 2320 are adjusted based on the set of losses.

Figure 8:
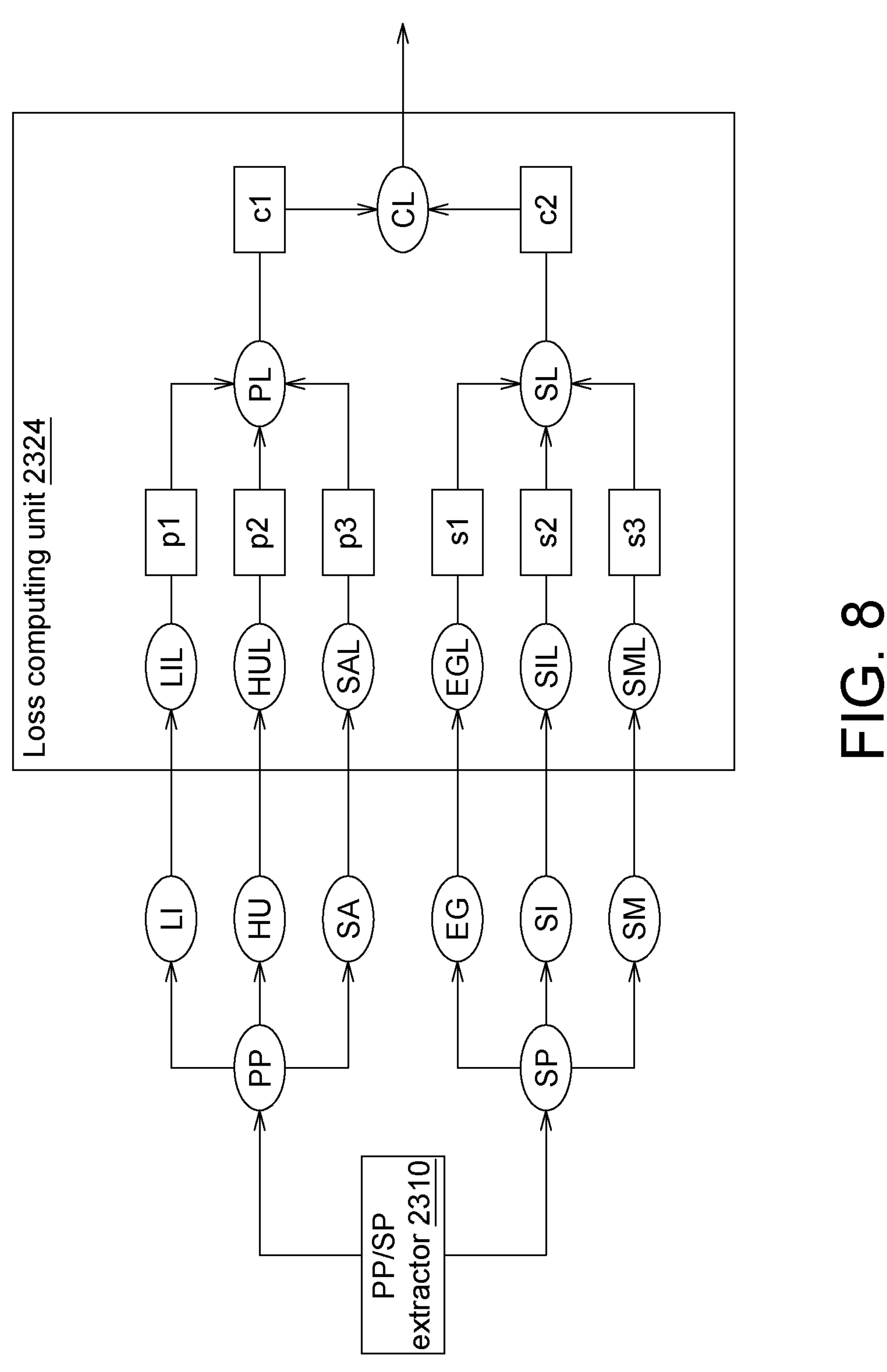
FIG. 8 illustrates an operation of the loss computing unit 2324.

Referring to FIG. 8 which illustrates an operation of the loss computing unit 2324. Firstly, the loss computing unit 2324 receives the perceptual parameters PP and the structural parameters SP from the PP/SP extractor 2310. The perceptual parameters PP include parameters of lightness LI, hue HU, and saturation SA. The structural parameters SP include parameters of edge EG, similarity SI, and smoothness SM.

The loss computing unit 2324 obtains a lightness loss LIL, a hue loss HUL, and a saturation loss SAL, which are respectively associated with parameters of the lightness LI, the hue HU, and the saturation SA of each image pair in the third set of training images TR3 or the fourth set of training images TR4. More particularly, the lightness loss LIL may be calculated based on a loss function of equation (6-1) with the lightness $LI_i$ at the i-th pixel of the labeled WE image (or the WE candidate) and the lightness $\widehat{LI}_i$ at the corresponding pixel of the labeled IE image in the image pair.

$$LIL = \frac{1}{N}\sum_{i=0}^{N} p(\widehat{LI}_i - LI_i)^2 \tag{6-1}$$

The loss computing unit 2324 calculates a hue loss HUL based on a loss function of equation (6-2) with the hue $HU_i$ at the i-th pixel of the labeled WE image (or the WE candidate) and the hue $\widehat{HU}_i$ at the corresponding pixel of the labeled IE image in the image pair.

$$HUL = \sqrt{\sum_{i=0}^{N} (\widehat{HU}_i - HU_i)^2} \tag{6-2}$$

The loss computing unit 2324 calculates a saturation loss SAL based on a loss function of equation (6-3) with the saturation $SA_i$ at the i-th pixel of the labeled WE image (or the WE candidate) and the saturation $\widehat{SA}_i$ at the corresponding pixel of the labeled IE image in the image pair.

$$sal = \sqrt{\sum_{i=0}^{N} (\widehat{SA}_i - SA_i)^2} \tag{6-3}$$

The loss computing unit 2324 obtains an edge loss EGL, a similarity loss SIL, and a smoothness loss SML, which are respectively associated with parameters of the edge EG, the similarity SI, and the smoothness SM of each image pair in the third set of training images TR3 or the fourth set of training images TR4. More particularly, the edge loss EGL may be calculated based on a loss function of equation (6-4) with the edge $EG_i$ at the i-th pixel of the labeled WE image (or the WE candidate) and the edge $\widehat{EG}_i$ at the corresponding pixel of the labeled IE image in the image pair.

$$EGL = \text{mean}\left(\frac{1}{16}\begin{bmatrix} 1 & 2 & 1 \\ 2 & 4 & 2 \\ 1 & 2 & 1 \end{bmatrix}(\widehat{EG}_i - EG_i)\right) \tag{6-4}$$

The loss computing unit 2324 calculates the similarity loss SIL based on a loss function of equations (6-5) and (6-6) with the similarity $SI_i$ at the i-th pixel of the labeled WE image (or the WE candidate) and the similarity $\widehat{SI}_i$ at the corresponding pixel of the labeled IE image in the image pair.

$$SIL = 1 - SSIM(\widehat{SI}_i, SI_i) \tag{6-5}$$

-continued $$SSIM = \left(\frac{2\mu_x\mu_y + C_1}{\mu_x^2 + \mu_y^2 + C_1}\right)^{\alpha}\left(\frac{2\sigma_x\sigma_y + C_2}{\sigma_x^2 + \sigma_y^2 + C_2}\right)^{\beta}\left(\frac{\sigma_{xy} + C_3}{\sigma_x\sigma_y + C_3}\right)^{\gamma} \quad (6\text{-}6)$$

The loss computing unit 2324 calculates the smoothness loss SML based on a loss function of equation (6-7) with the smoothness $SM_i$ at the i-th pixel of the labeled WE image (or the WE candidate) and the smoothness $\widehat{SM}_i$ at the corresponding pixel of the labeled IE image in the image pair.

$$SML = \text{mean}\left(\frac{\partial(\widehat{SM}_i - SM_i)}{\partial x} + \frac{\partial(\widehat{SM}_i - SM_i)}{\partial y}\right) \quad (6\text{-}7)$$

The loss computing unit 2324 obtains a perceptual loss PL associated with the perceptual parameters PP based on a loss function of equation (7-1) with the lightness loss LIL, the hue loss HUL, and the saturation loss SAL. The perceptual loss PL is calculated by summing the lightness loss LIL, the hue loss HUL, and the saturation loss SAL weighted by a scale p1, a scale p2, and a scale p3 respectively. The sum of the scales p1, p2, and p3 is equal to one, as shown in equation (7-2). In a default setting, the scales p1, p2, and p3 are set as “0.5”, “0.25”, and “0.25” respectively.

$$PL = p1 \times LIL + p2 \times HUL + p3 \times SAL \quad (7\text{-}1)$$

$$p1 + p2 + p3 = 1 \quad (7\text{-}2)$$

The scales p1, p2, and p3 may be adjusted according to the BL, OE, and UE types of the labeled IE images img_IE_L. When the labeled IE images img_IE_L are classified as the OE type, the scale p1 is adjusted as smaller than the scale p2, and the scale p2 is adjusted as smaller than the scale p3, as shown in equation (7-3).

$$p1 < p2 < p3 \quad (7\text{-}3)$$

When the labeled IE images img_IE_L are classified as the UE type, the scale p1 is adjusted as greater than the scale p2, and the scale p2 is adjusted as greater than the scale p3, as shown in equation (7-4).

$$p1 > p2 > p3 \quad (7\text{-}4)$$

When the labeled IE images img_IE_L are classified as the BL type, the scale p1 is adjusted as greater than the scales p2 and p3. Furthermore, the scale p2 is adjusted as equal to the scale p3, as shown in equations (7-5)~(7-7).

$$p1 > p2 \quad (7\text{-}5)$$

$$p1 > p3 \quad (7\text{-}6)$$

$$p2 = p3 \quad (7\text{-}7)$$

The loss computing unit 2324 obtains a structural loss SL associated with the structural parameters SP based on a loss function of equation (8-1) with the edge loss EGL, the similarity loss SIL, and the smoothness loss SML. The structural loss SL is calculated by summing the edge loss EGL, the similarity loss SIL, and the smoothness loss SML weighted by a scale s1, a scale s2, and a scale s3 respectively. The sum of the scales s1, s2, and s3 is equal to one, as shown in equation (8-2). In a default setting, the scales s1, s2, and s3 are set as “0.5”, “0.3”, and “0.2” respectively.

$$SL = s1 \times EGL + s2 \times SIL + s3 \times SML \quad (8\text{-}1)$$

$$s1 + s2 + s3 = 1 \quad (8\text{-}2)$$

The scales s1, s2, and s3 may be adjusted according to operation conditions of the correction system 1000. The correction system 1000 is suitable for at least two operation conditions of a human perception condition and a computer vision (CV) condition. For the human perception condition, the correction results (i.e., the output images img_OUT) of the correction system 1000 are suitable for visual experience of the user. On the other hand, for the computer vision condition, the correction results are suitable for computer vision processes, e.g., face detection (including face recognition) and object detection. When the operation condition is the human perception condition, the scale s1 is adjusted as greater than the scale s2 and the scale s3, and the scale s2 is adjusted as equal to the scale s3, as shown in equations (8-3) to (8-5).

$$s1 > s2 \quad (8\text{-}3)$$

$$s1 > s3 \quad (8\text{-}4)$$

$$s2 = s3 \quad (8\text{-}5)$$

When the operation condition is the computer vision condition, the scale s1 is adjusted as greater than the scale s2, and the scale s2 is adjusted as greater than the scale s3, as shown in equation (8-6).

$$s1 > s2 > s3 \quad (8\text{-}6)$$

The loss computing unit 2324 obtains a combined loss CL based on a loss function of equation (9-1), by summing the perceptual loss PL and the structural loss SL weighted by a factor c1 and a factor c2 respectively. The sum of the factors c1 and c2 is equal to one, as shown in equation (9-2). In a default setting, the factors c1 and c2 are set as “0.5” and “0.5” respectively.

$$CL = c1 \times PL + c2 \times SL \quad (9\text{-}1)$$

$$c1 + c2 = 1 \quad (9\text{-}2)$$

The factors c1 and c2 are adjusted according to the operation condition of the correction system 1000. When the operation condition is the human perception condition, the factor c1 is adjusted as greater than the factor c2, as shown in equation (9-3). When the operation condition is the computer vision condition, the factor c1 is adjusted as smaller than the factor c2, as shown in equation (9-4). Moreover, when the operation condition is a balance condition between the human perception condition and the computer vision condition, the factor c1 is adjusted as equal to the factor c2, as shown in equation (9-5).

$$c1 > c2 \tag{9-3}$$

$$c1 < c2 \tag{9-4}$$

$$c1 = c2 \tag{9-5}$$

In conclusion, the various embodiments and examples of the present disclosure provide an improved correction mechanism which well corrects the IE images of various exposure types (i.e., the BL, OE, and UE types). With the correction performed by the processing device 20, the output device 40, either integrated with or separated from the image capturing device 10, may provide better correction results (i.e., the output images img_OUT) of the WE type, no matter the exposure types of the original images img_ORG. In contrast, in some existing correction methods (other than those provided by the present disclosure), the aperture and shutter of the image capturing device may be roughly adjusted with an auto-exposure mode. However, these existing correction methods may not effectively deal with greatly varied range and direction of ambient light, when the image capturing device is disposed on a vehicle.

Furthermore, the WE images (i.e., the first WE images img_WE1) in the original images img_ORG are not processed, but directly provided as the output images img_OUT. Therefore, the first WE images img_WE1 may not be deteriorated by the correction performed on the IE images. In contrast, in some other existing correction methods than the present disclosure, all the IE images and WE images are performed with corrections, the WE images will be unnecessarily corrected and thus deteriorated.

Moreover, the classification is automatically achieved by utilizing the first computational model 2210, and the respective corrections (for the BL, OE, and UE types respectively) are automatically achieved by utilizing the second computational model 2320. In this manner, the processing device 20 of the present disclosure may provide automatic, rapid, and precise corrections. The related parameters of image processing of corrections (e.g., the ranges of the lightness distribution LD, etc.) may be set and adjusted automatically without data of experience. The first computational model 2210 and second computational model 2320 are well trained based on training images either with or without image pairs of IE images and WE images. When lacking labeled WE images for the training images, the WE candidates may be automatically generated. Therefore, the operations of the first computational model 2210 and second computational model 2320 may not depend on training samples which are manually labeled.

In addition, the second computational model 2320 is trained based on losses (i.e., the perceptual loss PL, the structural loss SL, and the combined loss CL) with adjustable scales and factors, where the scales s1-s3 and the factors c1 and c2 are adjustable for suiting the human perception condition or the computer vision condition. Hence, the correction mechanism of the present disclosure may well suit various operating conditions, the correction results of the correction system 1000 are well suitable for user's visual experience and computer vision processes (e.g., face detection and object detection). In contrast, in still some other existing correction methods than the present disclosure, the correction results are evaluated by human perception, but not suitable for successive computer vision processes.

The processing device 20 may greatly offload processing efforts of the image capturing device (and even other software or hardware elements), such that computing resources of the image capturing device and other elements may be greatly saved. Hence, when the correction system 1000 is installed or disposed in a computer machine, the overall function of the computing machine will be significantly improved, in view of aspects of full automation, enhanced computing speed, and computing resources allocation. Such as, when the correction system 1000 is installed or disposed in a computer machine executing the ADAS, the DMS, or the OMS, the correction system 1000 enables the computer machine to automatically classify the exposure types of the images and then automatically correct the IE images therein, and the computer machine may speed up its processing rate (i.e., Table 1 of the detailed description well supports the enhancement of the processing rate) to generate WE images for face or limbs detections of the driver or occupants. Also, computing resource of the camera of the computer machine for the ADAS, the DMS, or the OMS may be reserved, since the processing device 20 is responsible for most of the processing efforts.

It will be apparent to those skilled in the art that various modifications can be made to the disclosed embodiments. It is intended that the specification and examples be considered as exemplary only, with a true scope of the disclosure being indicated by following claims and their equivalents.

What is claimed is:

1. A correction method for ill-exposed (IE) images, comprising:

capturing a series of original images;

classifying the original images as a set of first well-exposed (WE) images and IE images utilizing a first computational model according to a lightness distribution of each of the original images, wherein the IE images have a plurality of exposure types including a back-lit (BL) type, an over-exposed (OE) type, and an under-exposed (UE) type;

correcting the IE images to obtain a set of second WE images utilizing a second computational model, wherein a plurality of perceptual parameters and structural parameters of each of the IE images are extracted and then adjusted according to the BL, OE, and UE types respectively, the perceptual parameters include lightness, hue and saturation, and the structural parameters include edge, similarity and smoothness; and providing the first WE images and the second WE images as a set of output images.

2. The correction method according to claim 1, wherein in an execution stage for correcting the IE images, the first computational model is utilized to classify the original images as the first WE images and IE images, comprising:

setting a plurality of ranges in the lightness distribution for each of the original images, wherein lightness has a plurality of levels, and the ranges comprising:

a first range, with a coverage including a maximal level of the lightness;

a second range, with a coverage including some of the levels substantially lower than those of the first range, and selectively overlapping the first range;

a third range, with a coverage including some of the levels substantially lower than those of the second range, and selectively overlapping the second range; and a fourth range, with a coverage including a minimal level of the lightness, and selectively overlapping the third range, in each of the original images, obtaining a total distribution value for each of the ranges; and classifying the original images according to the total distribution values of the ranges, comprising:

classifying the original images as the OE type, when the total distribution value of the first range is greater than a sum of the total distribution values of the second, the third, and the fourth ranges;

classifying the original images as the UE type, when the total distribution value of the fourth range is greater than a sum of the total distribution values of the first and the second ranges;

classifying the original images as the BL type, when a sum of the total distribution values of the first and the fourth ranges is greater than a sum of the total distribution values of the second and the third ranges; and classifying the original images as the first WE images, when not been classified as the OE, UE, and BL types.

3. The correction method according to claim 2, wherein the first computational model is trained by a first set of training images to adjust the ranges in the lightness distribution, comprising:

forming the first set of training images including a set of labeled IE images;

obtaining a set of statistic of the lightness distribution according to a label indicating the OE, UE, and BL types of the labeled IE images; and in the first computation model, adjusting the coverages of the ranges according to the set of statistic of the lightness distribution.

4. The correction method according to claim 2, wherein the first computational model is trained by a second set of training images to adjust the ranges in the lightness distribution, comprising:

forming the second set of training images including a set of image pairs of labeled IE images and labeled WE images;

in each of the image pairs in the second set of training images, obtaining a total distribution difference between the labeled WE image and the labeled IE image for each of the ranges;

obtaining a set of statistic of the lightness distribution according to the total distribution differences; and in the first computation model, adjusting the coverages of the ranges according to the set of statistic of the lightness distribution.

5. The correction method according to claim 1, wherein the second computational model is trained by a third set of training images to adjust a plurality of internal parameters of the second computational model, comprising:

forming the third set of training images including a set of image pairs of labeled IE images and labeled WE images;

extracting the perceptual parameters and the structural parameters of each of the third set of training images;

in each of the image pairs in the third set of training images, obtaining a set of losses according to the perceptual parameters and the structural parameters; and adjusting the internal parameters of the second computational model according to the set of losses.

6. The correction method according to claim 1, wherein the second computational model is trained by a fourth set of training images to adjust a plurality of internal parameters of the second computational model, comprising:

classifying a set of un-labeled images as the BL, OE, and UE types to form a set of labeled IE images by the first computational model;

extracting and then adjusting the perceptual parameters and the structural parameters of each of the labeled IE images according to the BL, OE, and UE types respectively to obtain a set of WE candidates, utilizing the second computational model;

forming the fourth set of training images including a set of image pairs of the labeled IE images and the WE candidates;

extracting the perceptual parameters and the structural parameters of each of the WE candidates;

for each of the image pairs in the fourth set of training images, obtaining a set of losses according to the perceptual parameters and the structural parameters; and adjusting the internal parameters of the second computational model according to the set of losses.

7. The correction method according to claim 5, wherein the step of obtaining the set of losses comprising:

obtaining a perceptual loss associated with the perceptual parameters of each of the image pairs;

obtaining a structural loss associated with the structural parameters of each of the image pairs; and obtaining a combined loss by summing the perceptual loss and the structural loss weighted by a first factor and a second factor respectively, wherein a sum of the first and the second factors is equal to one, and the first and the second factors are adjusted according to an operation condition, comprising:

the first factor is adjusted as greater than the second factor, when the operation condition is a human perception condition;

the first factor is adjusted as smaller than the second factor, when the operation condition is a computer vision condition; and the first factor is adjusted as equal to the second factor, when the operation condition is a balance condition.

8. The correction method according to claim 7, wherein the step of obtaining the perceptual loss comprising:

obtaining a lightness loss associated with the parameters of the lightness of each of the image pairs;

obtaining a hue loss associated with the parameters of the hue of each of the image pairs;

obtaining a saturation loss associated with the parameters of the saturation of each of the image pairs; and obtaining the perceptual loss by summing the lightness loss, the hue loss, and the saturation loss weighted by a first scale, a second scale, and a third scale respectively, wherein a sum of the first to the third scales is equal to one, and the first to the third scales are adjusted according to the exposure types, comprising:

the first scale is adjusted as smaller than the second scale, and the second scale is adjusted as smaller than the third scale, when the IE images are classified as the OE type;

the first scale is adjusted as greater than the second scale, and the second scale is adjusted as greater than the third scale, when the IE images are classified as the UE type; and the first scale is adjusted as greater than the second scale and the third scale, and the second scale is adjusted as equal to the third scale, when the IE images are classified as the BL type.

9. The correction method according to claim 7, wherein the step of obtaining the structural loss comprising:

obtaining an edge loss associated with the parameters of the edge of each of the image pairs;

obtaining a similarity loss associated with the parameters of the similarity of each of the image pairs;

obtaining a smoothness loss associated with the parameters of the smoothness of each of the image pairs; and obtaining the structural loss by summing the edge loss, the similarity loss, and the smoothness loss weighted by a fourth scale, a fifth scale and a sixth scale respectively, wherein a sum of the fourth to the sixth scales is equal to one, and the fourth to the sixth scales are adjusted according to the operation condition, comprising:

the fourth scale is adjusted as greater than the fifth scale and the sixth scale, and the fifth scale is adjusted as equal to the sixth scale, when the operation condition is the human perception condition; and the fourth scale is adjusted as greater than the fifth scale, and the fifth scale is adjusted as greater than the sixth scale, when the operation condition is the computer vision condition.

10. A correction system for ill-exposed (IE) images, comprising:

an image capturing device, for capturing a series of original images;

a processing device, coupled with the image capturing device and/or a storage device to receive the original images, comprising:

a first processing unit, for operating a first computational model to classify the original images as a set of first well-exposed (WE) images and IE images according to a lightness distribution of each of the original images, wherein the IE images have a plurality of exposure types including a back-lit (BL) type, an over-exposed (OE) type, and an under-exposed (UE) type; and a second processing unit, for operating a second computational model to correct the IE images to obtain a set of second WE images, wherein a plurality of perceptual parameters and structural parameters of each of the IE images are extracted and then adjusted according to the BL, OE, and UE types respectively, the perceptual parameters include lightness, hue and saturation, and the structural parameters include edge, similarity and smoothness; and an output device, coupled with the processing device to receive the first WE images and the second WE images, for providing the first WE images and the second WE images as a set of output images.

11. The correction system according to claim 10, wherein in an execution stage for correcting the IE images the first computational model is utilized to classify the original images as the first WE images and IE images, and the first processing unit is configured for:

setting a plurality of ranges in the lightness distribution for each of the original images, wherein the lightness has a plurality of levels, and the ranges comprising:

a first range, with a coverage including a maximal level of the lightness;

a second range, with a coverage including some of the levels substantially lower than those of the first range, and selectively overlapping the first range;

a third range, with a coverage including some of the levels substantially lower than those of the second range, and selectively overlapping the second range; and a fourth range, with a coverage including a minimal level of the lightness, and selectively overlapping the third range, in each of the original images, obtaining a total distribution value for each of the ranges; and classifying the original images according to the total distribution values of the ranges, comprising:

classifying the original images as the OE type, when the total distribution value of the first range is greater than a sum of the total distribution values of the second, the third, and the fourth ranges;

classifying the original images as the UE type, when the total distribution value of the fourth range is greater than a sum of the total distribution values of the first and the second ranges;

classifying the original images as the BL type, when a sum of the total distribution values of the first and the fourth ranges is greater than a sum of the total distribution values of the second and the third ranges; and classifying the original images as the first WE images, when not been classified as the OE, UE, and BL types.

12. The correction system according to claim 11, wherein the first computational model is trained by a first set of training images to adjust the ranges in the lightness distribution, and the first processing unit is configured for:

obtaining the first set of training images including a set of labeled IE images, from the image capturing device or the storage device;

obtaining a set of statistic of the lightness distribution according to a label indicating the OE, UE, and BL types of the labeled IE images; and in the first computation model, adjusting the coverages of the ranges according to the set of statistic of the lightness distribution.

13. The correction system according to claim 11, wherein the first computational model is trained by a second set of training images to adjust the ranges in the lightness distribution, and the first processing unit is configured for:

obtaining the second set of training images including a set of image pairs of labeled IE images and labeled WE images, from the image capturing device or the storage device;

in each of the image pairs in the second set of training images, obtaining a total distribution difference between the labeled WE image and the labeled IE image for each of the ranges;

obtaining a set of statistic of the lightness distribution according to the total distribution differences; and in the first computation model, adjusting the coverages of the ranges according to the set of statistic of the lightness distribution.

14. The correction system according to claim 10, wherein the second computational model is trained by a third set of training images to adjust a plurality of internal parameters of the second computational model, and the second processing unit is configured for:

obtaining the third set of training images including a set of image pairs of labeled IE images and labeled WE images, from the image capturing device or the storage device;

extracting the perceptual parameters and the structural parameters of each of the third set of training images;

in each of the image pairs in the third set of training images, obtaining a set of losses according to the perceptual parameters and the structural parameters; and adjusting the internal parameters of the second computational model according to the set of losses.

15. The correction system according to claim 10, wherein the second computational model is trained by a fourth set of training images to adjust a plurality of internal parameters of the second computational model, and the second processing unit is configured for:

obtaining a set of un-labeled images from the image capturing device or the storage device;

cooperating with the first processing unit to classify the un-labeled images as the BL, OE, and UE types to form a set of labeled IE images utilizing the first computational model;

extracting and then adjusting the perceptual parameters and the structural parameters of each of the labeled IE images according to the BL, OE, and UE types respectively to obtain a set of WE candidates, utilizing the second computational model;

forming the fourth set of training images including a set of image pairs of the labeled IE images and the WE candidates;

extracting the perceptual parameters and the structural parameters of each of the WE candidates;

for each of the image pairs in the fourth set of training images, obtaining a set of losses according to the perceptual parameters and the structural parameters; and adjusting the internal parameters of the second computational model according to the set of losses.

16. The correction system according to claim 14, wherein when obtaining the set of losses the second processing unit is configured for:

obtaining a perceptual loss associated with the perceptual parameters of each of the image pairs;

obtaining a structural loss associated with the structural parameters of each of the image pairs; and obtaining a combined loss by summing the perceptual loss and the structural loss weighted by a first factor and a second factor respectively, wherein a sum of the first and the second factors is equal to one, and the first and the second factors are adjusted according to an operation condition, comprising:

the first factor is adjusted as greater than the second factor, when the operation condition is a human perception condition;

the first factor is adjusted as smaller than the second factor, when the operation condition is a computer vision condition; and the first factor is adjusted as equal to the second factor, when the operation condition is a balance condition.

17. The correction system according to claim 16, wherein when obtaining the perceptual loss the second processing unit is configured for:

obtaining a lightness loss associated with the parameters of the lightness of each of the image pairs;

obtaining a hue loss associated with the parameters of the hue of each of the image pairs;

obtaining a saturation loss associated with the parameters of the saturation of each of the image pairs; and obtaining the perceptual loss by summing the lightness loss, the hue loss, and the saturation loss weighted by a first scale, a second scale, and a third scale respectively, wherein a sum of the first to the third scales is equal to one, and the first to the third scales are adjusted according to the exposure types, comprising:

the first scale is adjusted as smaller than the second scale, and the second scale is adjusted as smaller than the third scale, when the IE images are classified as the OE type;

the first scale is adjusted as greater than the second scale, and the second scale is adjusted as greater than the third scale, when the IE images are classified as the UE type; and the first scale is adjusted as greater than the second scale and the third scale, and the second scale is adjusted as equal to the third scale, when the IE images are classified as the BL type.

18. The correction system according to claim 16, wherein when obtaining the structural loss the second processing unit is configured for:

obtaining an edge loss associated with the parameters of the edge of each of the image pairs;

obtaining a similarity loss associated with the parameters of the similarity of each of the image pairs;

obtaining a smoothness loss associated with the parameters of the smoothness of each of the image pairs; and obtaining the structural loss by summing the edge loss, the similarity loss, and the smoothness loss weighted by a fourth scale, a fifth scale and a sixth scale respectively, wherein a sum of the fourth to the sixth scales is equal to one, and the fourth to the sixth scales are adjusted according to the operation condition, comprising:

the fourth scale is adjusted as greater than the fifth scale and the sixth scale, and the fifth scale is adjusted as equal to the sixth scale, when the operation condition is the human perception condition; and the fourth scale is adjusted as greater than the fifth scale, and the fifth scale is adjusted as greater than the sixth scale, when the operation condition is the computer vision condition.

* * * * *